(12) United States Patent
Fukuda et al.

(10) Patent No.: US 10,792,903 B2
(45) Date of Patent: Oct. 6, 2020

(54) TRANSFER SHEET AND HARD COAT BODY USING SAME

(71) Applicant: Dai Nippon Printing Co., Ltd., Tokyo (JP)

(72) Inventors: Shunji Fukuda, Tokyo (JP); Junichi Tamuki, Tokyo (JP); Keisuke Koyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 349 days.

(21) Appl. No.: 15/523,688

(22) PCT Filed: Nov. 5, 2015

(86) PCT No.: PCT/JP2015/081164
§ 371 (c)(1),
(2) Date: May 2, 2017

(87) PCT Pub. No.: WO2016/072450
PCT Pub. Date: May 12, 2016

(65) Prior Publication Data
US 2017/0313911 A1 Nov. 2, 2017

(30) Foreign Application Priority Data
Mar. 26, 2015 (JP) .................................. 2015-065208

(51) Int. Cl.
| | | |
|---|---|---|
| *B32B 7/12* | (2006.01) | |
| *B32B 27/30* | (2006.01) | |
| *B32B 27/40* | (2006.01) | |
| *C09J 201/00* | (2006.01) | |
| *B32B 33/00* | (2006.01) | |
| *B29C 41/00* | (2006.01) | |
| *C09J 7/24* | (2018.01) | |
| *C09J 7/50* | (2018.01) | |
| *B29C 45/16* | (2006.01) | |
| *B32B 7/06* | (2019.01) | |
| *B32B 27/08* | (2006.01) | |
| *C09J 157/06* | (2006.01) | |

(52) U.S. Cl.
CPC ............ *B32B 27/308* (2013.01); *B29C 41/00* (2013.01); *B29C 45/1679* (2013.01); *B32B 7/06* (2013.01); *B32B 7/12* (2013.01); *B32B 27/08* (2013.01); *B32B 27/40* (2013.01); *B32B 33/00* (2013.01); *C09J 7/24* (2018.01); *C09J 7/50* (2018.01); *C09J 201/00* (2013.01); *B32B 2307/4026* (2013.01); *B32B 2307/536* (2013.01); *C09J 157/06* (2013.01); *C09J 2201/606* (2013.01); *C09J 2205/114* (2013.01); *C09J 2433/00* (2013.01); *C09J 2433/003* (2013.01); *C09J 2433/006* (2013.01); *C09J 2467/006* (2013.01); *C09J 2475/003* (2013.01)

(58) Field of Classification Search
None
See application file for complete search history.

(56) References Cited

U.S. PATENT DOCUMENTS

| | | | |
|---|---|---|---|
| 2013/0309460 A1* | 11/2013 | Saitou .................... | B05D 7/24 428/195.1 |
| 2015/0290852 A1 | 10/2015 | Nakagawa et al. | |
| 2016/0046052 A1* | 2/2016 | Ito ......................... | B32B 15/08 428/354 |
| 2016/0221870 A1 | 8/2016 | Arita et al. | |

FOREIGN PATENT DOCUMENTS

| | | | |
|---|---|---|---|
| EP | 3047970 A1 | | 7/2016 |
| JP | 06100653 A | * | 4/1994 |
| JP | 10001524 A | * | 1/1998 |
| JP | 10-166510 A | | 6/1998 |
| JP | 2000-043218 A | | 2/2000 |
| JP | 2001-009972 A | | 1/2001 |
| JP | 2001-129938 A | | 5/2001 |
| JP | 2002-052678 A | | 2/2002 |
| JP | 2005-225127 A | | 8/2005 |
| JP | 2007-253341 A | | 10/2007 |
| JP | 2012-076354 A | | 4/2012 |
| JP | 2013-071255 A | | 4/2013 |

(Continued)

OTHER PUBLICATIONS

Ishida, Seiichi et al., "Decorative Sheet for Building Material", machine translation of JP 2001-009972A, published Jan. 16, 2001. (Year: 2001).*
Nakamura, Shinya et al., "Laminated Film", machine translation of JP 2005-225127A, published on Aug. 25, 2005. (Year: 2005).*
Shinya, Nakamura et al., "Laminated Film", English translation of JP 2005-225127A, published Aug. 25, 2005. (Year: 2005).*
Seiichi, Ishida et al., "Cosmetic Sheet for Use As a Construction Material", English translation JP2001-009972A, Jan. 16, 2001 (Year: 2001).*
Nagai, Sanezumi et al., "Acrylic Urethane Copolymer, Production Thereof, and Paint Composition Containing the Same", English translation of JP 10-001524A, Jan. 6, 1998 (Year: 1998).*

(Continued)

*Primary Examiner* — Anish P Desai
(74) *Attorney, Agent, or Firm* — Locke Lord LLP

(57) ABSTRACT

The purpose of the present invention is to provide a transfer sheet capable of providing hard coat properties and excellent weather resistance to a resin molded article such as organic glass. The transfer sheet has, in order, a base material film for mold release, a hard coat layer, a primer layer, and an adhesive layer. The weather resistance and adhesiveness of the hard coat layer and the primer layer are improved and hard coat properties and excellent weather resistance can be provided to a resin molded article being the transfer object, as a result of: the hard coat layer being formed from a cured product of a resin composition including a curable resin; and the primer layer being formed from a binder resin including a polyurethane having a mass-average molecular weight of 40,000-100,000 and including 1-30% by mass of an acrylic component.

5 Claims, 2 Drawing Sheets

(56) References Cited

FOREIGN PATENT DOCUMENTS

| JP | 2013-075502 A | 4/2013 | | |
|---|---|---|---|---|
| WO | WO-2012101820 A1 * | 8/2012 | ............... | B05D 7/24 |
| WO | 2014-083732 A1 | 6/2014 | | |
| WO | WO-2014097876 A1 * | 6/2014 | ............... | B32B 7/02 |
| WO | 2015/041334 A1 | 3/2015 | | |

OTHER PUBLICATIONS

Akira, Tateishi et al., "Acryl Grafted Polyurethane Compound and Method for Producing the Same", English translation of JP 06-100653A, Apr. 12, 1994 (Year: 1994).*
Search Reoprt dated May 17, 2018, issued for the European patent application No. 15856871.7.
International Search Report dated Feb. 2, 2016, issued for PCT/JP2015/081164.

* cited by examiner

TRANSFER SHEET AND HARD COAT BODY USING SAME

TECHNICAL FIELD

The present invention relates to a transfer sheet and a hard coated article including the same. More specifically, the present invention relates to a transfer sheet capable of imparting excellent weather resistance together with hard coat properties to a resin molded article formed of organic glass or the like, and a hard coated article including the same.

BACKGROUND ART

Resin molded articles formed of polycarbonate, polyacrylate, polymethyl methacrylate, polyethylene terephthalate, polyethylene naphthalate, polyolefin, ABS and the like are excellent in transparency and lighter than inorganic glass, so that these resin molded articles as organic glass are conventionally widely used as a substitute for inorganic glass in various fields. Among these resins, polycarbonate is particularly excellent in impact resistance, heat resistance, transparency and the like, and use of polycarbonate is considered as to exterior materials and interior materials of building structures of general housing and public facilities, interior and exterior parts of automobiles, solar cell covers or solar cell substrates, members of household electric appliances and the like.

Meanwhile, resin molded articles are inferior to inorganic glass in terms of weather resistance and abrasion resistance. Thus, in order to compensate for the drawback, generally, a hard coat layer made of a cured resin is laminated on the surface of a resin molded article to impart hard coat properties (such as scratch resistance) to the resin molded article. Conventionally, as one method of laminating a hard coat layer on a resin molded article, there is known a technique of using a transfer sheet including a base material film for releasing (base film) and a hard coat layer provided on the film, and transferring the hard coat layer to a resin molded article.

Conventionally, intensive studies have been conducted on a transfer sheet used for laminating a hard coat layer on a resin molded article in order to improve functionality of the sheet. For example, Patent Document 1 discloses that a hard coat transfer material including a release layer, a hard coat layer, a primer layer, and a heat seal layer sequentially formed on one surface of a base film, in which the release layer is mainly formed of a wax having a penetration at 25° C. of 10 or less and the hard coat layer is formed of an ultraviolet ray or electron beam curable resin, can efficiently impart a hard coat function to a base material as a transfer object easily and at low cost, and can also reduce facility contamination during coating processing. In addition, Patent Document 2 discloses that a surface-protected transfer material including an ionizing radiation resin layer made of an ionizing radiation curable resin, an intermediate first layer made of a butyral resin and an isocyanate, an intermediate second layer containing a butyral resin, and an adhesive layer in this order can provide excellent scratch resistance, transparency, solvent resistance, chemical resistance, and water resistance.

However, the conventional transfer sheet is not satisfactory in terms of imparting weather resistance to the resin molded article, although it capable of imparting a certain level of hard coat properties to the resin molded article. Particularly in resin molded articles used in exterior or semi-exterior materials such as windows of automobiles, windows of buildings, roof members for terraces and carports, entrance doors, soundproof walls, windshield walls, and balcony partitions, very high weather resistance is demanded since these resin molded articles are always exposed to direct sunlight and weather. However, at present, conventional transfer sheets do not satisfy such demand sufficiently with respect to such resin molded articles.

PRIOR ART DOCUMENTS

Patent Documents

Patent Document 1: Japanese Patent Laid-open Publication No. 2007-253341
Patent Document 2: Japanese Patent Laid-open Publication No. 10-166510

SUMMARY OF THE INVENTION

Problem to be Solved by the Invention

Conventionally, as a technique of laminating a hard coat layer on a resin molded article, in addition to the above-mentioned method in which a transfer sheet is used, there is known a lamination method of laminating a laminate sheet including a hard coat layer on a resin molded article. The laminate sheet used in such a lamination method has a layer structure including a primer layer and a hard coat layer laminated in this order on a base material film. In the production of the laminate sheet, after the primer layer is formed on the base material film, the hard coat layer is formed by applying a resin composition containing a curable resin to the primer layer and curing the resin. Thus, the primer layer and the hard coat layer are firmly adhered to each other, and excellent weather-resistant adhesion is obtained.

Meanwhile, the transfer sheet described above is different in the layer structure from the laminate sheet, that is, it has a layer structure including a hard coat layer, a primer layer, and an adhesive layer laminated in this order on a base material film for releasing. Therefore, the transfer sheet is different from the laminate sheet also in terms of the production process, and is produced by curing a resin composition containing a curable resin on a base material film for releasing to form a hard coat layer, and then forming a primer layer and an adhesive layer in this order. As described above, in such a transfer sheet, since the primer layer is formed after the hard coat layer is formed by curing the curable resin, the weather-resistant adhesion between the hard coat layer and the primer layer is insufficient. It is believed that this is one cause of the decrease in the weather resistance.

Accordingly, an object of the present invention is to provide a transfer sheet capable of imparting excellent weather resistance together with hard coat properties to a resin molded article formed of organic glass or the like. It is another object of the present invention to provide a hard coated article obtained by transferring a hard coat layer to a resin molded article by using the transfer sheet.

Means for Solving the Problem

As a result of intensive studies to solve the above problem, the present inventors have found the following matter: in a transfer sheet including a base material film for releasing, a hard coat layer, a primer layer, and an adhesive layer in this order, when the hard coat layer is formed of a cured product of a resin composition containing a curable resin, and the primer layer is formed of a binder resin containing polyurethane having a mass average molecular weight of 40,000 to 100,000 and containing 1 to 30% by mass of an acrylic component, weather-resistant adhesion between the hard coat layer and the primer layer is improved and it is possible to impart excellent weather resistance together with hard coat properties to a resin molded article as a transfer object. The present invention has been completed by further conducting studies based on the above-mentioned finding.

That is, the present invention provides inventions of aspects as listed below.

Item 1. A transfer sheet including: at least a base material film for releasing, a hard coat layer, a primer layer, and an adhesive layer in this order,
wherein the hard coat layer is formed of a cured product of a resin composition containing a curable resin, and
the primer layer is formed of a binder resin containing polyurethane having a mass average molecular weight of 40,000 to 100,000 and containing 1 to 30% by mass of an acrylic component.

Item 2. The transfer sheet according to item 1, wherein the polyurethane has a mass average molecular weight of 50,000 to 80,000 and contains 5 to 20% by mass of an acrylic component.

Item 3. The transfer sheet according to item 1 or 2, wherein the polyurethane is a urethane acrylic copolymer.

Item 4. The transfer sheet according to any one of items 1 to 3, wherein the polyurethane is a polycarbonate-based urethane acrylic copolymer and/or a polyester-based urethane acrylic copolymer.

Item 5. The transfer sheet according to any one of items 1 to 4, wherein the curable resin is an ionizing radiation curable resin.

Item 6. The transfer sheet according to any one of items 1 to 5, wherein the curable resin is a combination of (i) a tri- or more functional ionizing radiation curable resin and (ii) a bifunctional (meth)acrylate monomer.

Item 7. The transfer sheet according to any one of items 1 to 6, wherein the adhesive layer contains a heat-sensitive adhesive resin or a pressure-sensitive adhesive resin.

Item 8. The transfer sheet according to any one of items 1 to 7, including a colored layer provided in part of at least one position of between the base material film for releasing and the hard coat layer, between the hard coat layer and the primer layer, between the primer layer and the adhesive layer, and on a surface of the adhesive layer reverse to the primer layer.

Item 9. A hard coated article including: at least a hard coat layer, a primer layer, an adhesive layer, and a resin molded article in this order,
wherein the hard coat layer is formed of a cured product of a resin composition containing a curable resin, and
the primer layer is formed of a binder resin containing polyurethane having a mass average molecular weight of 40,000 to 100,000 and containing 1 to 30% by mass of an acrylic component.

Item 10. The hard coated article according to item 9, wherein the polyurethane has a mass average molecular weight of 50,000 to 80,000 and contains 5 to 20% by mass of an acrylic component.

Item 11. The hard coated article according to item 9 or 10, wherein the polyurethane is a urethane acrylic copolymer.

Item 12. The hard coated article according to any one of items 9 to 11, wherein the polyurethane is a polycarbonate-based urethane acrylic copolymer and/or a polyester-based urethane acrylic copolymer.

Item 13. The hard coated article according to any one of items 9 to 12, wherein the curable resin is an ionizing radiation curable resin.

Item 14. The hard coated article according to any one of items 9 to 13, wherein the curable resin is a combination of (i) a tri- or more functional ionizing radiation curable resin and (ii) a bifunctional (meth)acrylate monomer.

Item 15. The hard coated article according to any one of items 9 to 14, wherein the adhesive layer contains a heat-sensitive adhesive resin or a pressure-sensitive adhesive resin.

Item 16. The hard coated article according to any one of items 9 to 15, including a colored layer provided in part of at least one position of on a surface of the hard coat layer, between the hard coat layer and the primer layer, between the primer layer and the adhesive layer, and between the adhesive layer and the resin molded article.

Item 17. A method for producing a hard coated article, including sticking the transfer sheet according to any one of items 1 to 8 to a resin molded article so that the adhesive layer comes into contact with the resin molded article, and then peeling off the base material film for releasing.

Item 18. The method according to item 17, wherein the transfer sheet according to any one of items 1 to 8 is stuck to a pre-molded resin molded article, and then the base material film for releasing is peeled off.

Item 19. The method according to item 17, wherein a resin is injected onto the transfer sheet according to any one of items 1 to 8 to integrate the resin with the transfer sheet, and then the base material film for releasing is peeled off.

Advantages of the Invention

With the transfer sheet of the present invention, it is possible to laminate a hard coat layer formed of a cured product of a resin composition containing a curable resin on a resin molded article as a transfer object, whereby excellent hard coat properties (such as scratch resistance) can be provided to the resin molded article. Further, in the transfer sheet of the present invention, since weather-resistant adhesion between the hard coat layer and the primer layer is improved, it is possible to impart excellent weather resistance to the resin molded article as a transfer object.

The hard coated article of the present invention has both hard coat properties produced by a hard coat layer formed of a cured product of a resin composition containing a curable resin, and excellent weather resistance produced by a primer layer containing a specific binder resin. Thus, the hard coated article is capable of sufficiently having the performance (hard coat properties and weather resistance) required of the exterior members or semi-exterior members exposed to direct sunlight and weather.

EMBODIMENTS OF THE INVENTION

1. Transfer Sheet

Figure 1:
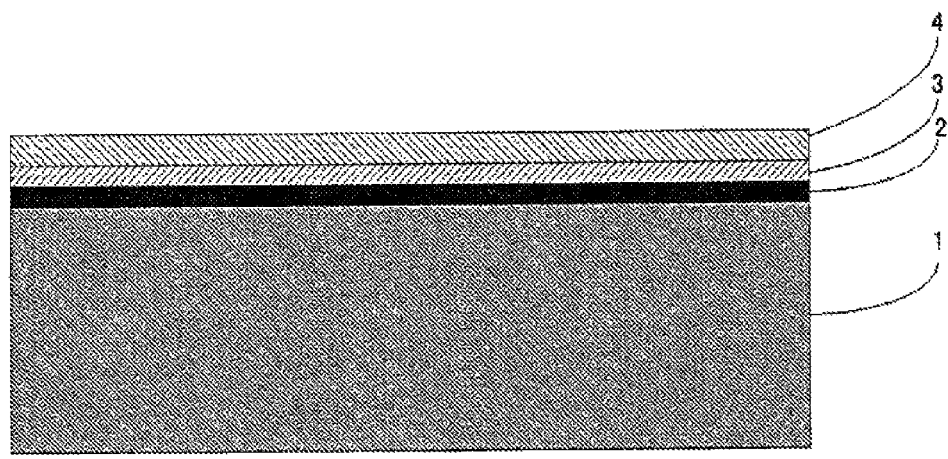
FIG. 1 is a schematic view showing a cross section of a transfer sheet according to one aspect of the present invention.

The transfer sheet of the present invention includes at least a base material film 1 for releasing, a hard coat layer 2, a primer layer 3, and an adhesive layer 4 in this order. The hard coat layer 2 is formed of a cured product of a resin composition containing a curable resin, and the primer layer 3 is formed of a binder resin containing polyurethane having a mass average molecular weight of 40,000 to 100,000 and containing 1 to 30% by mass of an acrylic component. Hereinafter, the transfer sheet of the present invention will be described in detail.

Laminated Structure of Transfer Sheet

As shown in FIG. 1, the transfer sheet of the present invention has a laminated structure including at least a base material film 1 for releasing, a hard coat layer 2, a primer layer 3, and an adhesive layer 4 in this order.

Figure 2:
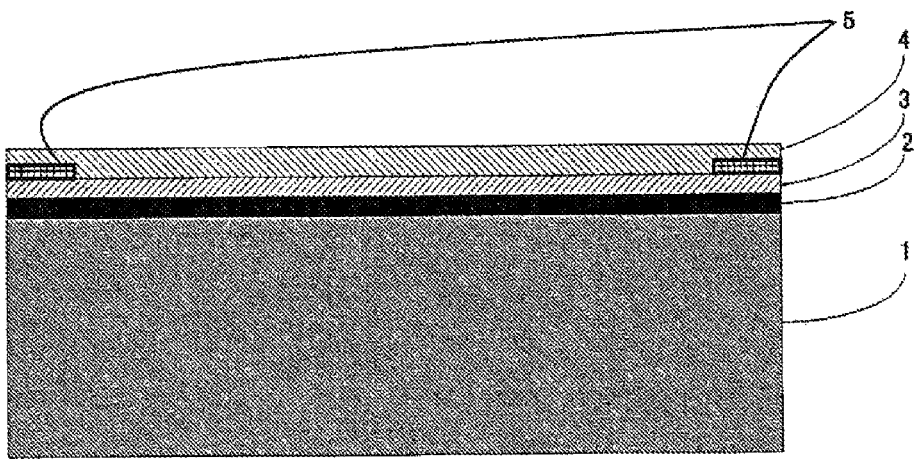
FIG. 2 is a schematic view showing a cross section of a transfer sheet according to one aspect of the present invention.

Besides, in the transfer sheet of the present invention, in order to facilitate peeling of the base material film 1 for releasing, a release layer may be provided as necessary between the base material film 1 for releasing and the hard coat layer 2. Further, the transfer sheet of the present invention may include a colored layer 5 provided in part of at least one position of between the hard coat layer 2 and the primer layer 3, between the primer layer 3 and the adhesive layer 4, and on a surface of the adhesive layer 4 reverse to the primer layer 3 for the purpose of concealing an adhesive-coated portion at the time of fixing the hard coated article produced by using the transfer sheet of the present invention, displaying information, imparting design property and the like. FIG. 2 is a schematic view of a cross section of a transfer sheet according to one aspect of the present invention in which the colored layer 5 is formed between the primer layer 3 and the adhesive layer 4.

Constituent Layers of Transfer Sheet

[Base Material Film 1 for Releasing]

The base material film 1 for releasing serves as a support base material for supporting the hard coat layer 2, the primer layer 3, and the adhesive layer 4, and is peeled off after the hard coat layer 2, the primer layer 3, and the adhesive layer 4 are transferred to a transfer object.

The constituent resin of the base material film 1 for releasing is not particularly limited as far as the film can be used as a support base material and can be peeled off the hard coat layer 2. Examples thereof include polyester resins such as polyethylene terephthalate, polybutylene terephthalate, polyethylene naphthalate, and an ethylene terephthalate-isophthalate copolymer resin; polyolefin resins such as polyethylene and polypropylene; vinyl resins such as polyvinyl chloride, polyvinylidene chloride, polyvinyl alcohol, an ethylene-vinyl acetate copolymer, and an ethylene-vinyl alcohol copolymer; acrylic resins such as polymethyl (meth) acrylate and polyethyl (meth)acrylate; styrene resins such as polystyrene; polyamide resins such as nylon 6, nylon 66, and MXD 6 (polymetaxylylene adipamide); an acrylonitrile-butadiene-styrene copolymer, cellulose triacetate, and polycarbonate. Among them, a polyethylene terephthalate resin is preferred from the viewpoint of dimensional stability.

Further, although the base material film 1 for releasing may be either an unstretched film or a stretched film, a stretched film is preferably used from the viewpoint of suppressing shrinkage due to heat or ionizing radiation irradiation during production of the transfer film, and providing excellent dimensional stability. Although the stretched film may be either monoaxially stretched or biaxially stretched, the stretched film is preferably biaxially stretched from the viewpoint of providing excellent dimensional stability.

The base material film 1 for releasing may be a monolayer film formed using a single resin film or may be a multilayer film formed using the same or different resin films.

Further, in order to adjust the peeling strength to the hard coat layer 1, the base material film 1 for releasing may be subjected to surface treatment such as corona discharge, glow discharge, plasma discharge, ozone/UV irradiation, flame treatment, hot air treatment, or chromium oxidation treatment as necessary.

The thickness of the base material film 1 for releasing is generally 20 to 200 μm, preferably 30 to 100 μm, more preferably 38 to 80 μm.

[Hard Coat Layer 2]

The hard coat layer 2 is a layer provided between the base material film 1 for releasing and the primer layer 3. After being transferred to a resin molded article as a transfer object, the hard coat layer 2 is positioned on the outermost surface to impart hard coat properties (such as scratch resistance) to the resin molded article, and also contributes to an improvement in weather resistance.

<Curable Resin>

The hard coat layer 2 is formed of a cured product of a resin composition containing a curable resin. The curable resin used for forming the hard coat layer 2 is not particularly limited as far as it is a resin that is cured by crosslinking. For example, a thermosetting resin, a room temperature curable resin, a one-liquid reaction curable resin, a two-liquid reaction curable resin, and an ionizing radiation curable resin can be mentioned.

Among the curable resins used in the hard coat layer 2, specific examples of the thermosetting resin, room temperature curable resin, one-liquid reaction curable resin, or two-liquid reaction curable resin include an epoxy resin, a phenol resin, a urea resin, a thermosetting polyester resin, a melamine resin, an alkyd resin, a polyimide resin, a silicone resin, a thermosetting acrylic resin, and a polyurethane resin. The mode of the curing reaction of these resins is not particularly limited, and there are the following modes, for example: for the epoxy resin, a reaction with an amine, an acid catalyst, a carboxylic acid, an acid anhydride, a hydroxyl group, dicyandiamide or ketimine; for the phenol resin, a reaction of a basic catalyst with an excess aldehyde; for the urea resin, a polycondensation reaction under alkaline or acidic conditions; for the thermosetting polyester resin, a co-condensation reaction of maleic anhydride with a diol; for the melamine resin, a heat polycondensation reaction of methylol melamine; for the alkyd resin, a reaction of unsaturated groups introduced into the side chain or the like by air oxidation; for the polyimide resin, a reaction in the presence of an acid or weak alkaline catalyst, or a reaction with an isocyanate compound (in the case of a two-liquid type); for the silicone resin, a condensation reaction of a silanol group in the presence of an acid catalyst; for the thermosetting acrylic resin, a reaction of its own amino resin with a hydroxyl group (in the case of a one-liquid type) in the case of a hydroxyl group-functional acrylic resin, or a reaction of a carboxylic acid such as acrylic acid or methacrylic acid with an epoxy compound in the case of a carboxyl-functional acrylic resin; and for the urethane resin, a reaction of a resin such as a polyester resin, a polyether resin, or an acrylic resin containing a hydroxyl group with an isocyanate compound or a modified product thereof. In the case of the thermosetting resin, a crosslinking agent, a polymerization initiator, a polymerization accelerator, and the like are used as necessary in order to promote the curing reaction. These curable resins may be used alone, or may be used in combination of two or more thereof.

Among the curable resins used in the hard coat layer 2, specific examples of the ionizing radiation curable resin include an appropriate mixture of a prepolymer, an oligomer, and/or a monomer that have a polymerizable unsaturated bond or an epoxy group in the molecule. The ionizing radiation means an electromagnetic wave or a charged particle beam having an energy quantum capable of polymerizing or crosslinking molecules, and an ultraviolet ray or an electron beam is generally used. As the ionizing radiation curable resin, those which are radical-polymerizable (curable) by electron beam irradiation are preferred.

As the monomer used as an ionizing radiation curable resin, (meth)acrylate monomers having a radical-polymerizable unsaturated group in the molecule are suitable, and among them, polyfunctional (meth)acrylate monomers are preferred. The polyfunctional (meth)acrylate monomer may be a (meth)acrylate monomer having two or more polymerizable unsaturated bonds in the molecule (bi- or more functional monomer). Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth) acrylate, hydroxypivalic acid neopentyl glycol di(meth) acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate, and caprolactone-modified dipentaerythritol hexa(meth)acrylate. In the present invention, the "(meth)acrylate" means an "acrylate" or a "methacrylate", and the same applies to other similar terms. These monomers may be used alone, or may be used in combination of two or more thereof.

As the oligomer used as an ionizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (bi- or more functional oligomers) are preferred. Examples of the polyfunctional (meth)acrylate oligomer include polycarbonate (meth)acrylate, urethane (meth)acrylate, epoxy (meth)acrylate, polyester (meth)acrylate, polyether (meth)acrylate, and polybutadiene (meth) acrylate. The polycarbonate (meth)acrylate can be obtained, for example, by esterifying a polycarbonate polyol with (meth) acrylic acid. The urethane (meth)acrylate can be obtained, for example, by esterifying a polyurethane oligomer, which is obtained by reacting a polyether polyol or a polyester polyol with a polyisocyanate, with (meth)acrylic acid. The epoxy (meth)acrylate can be obtained, for example, by reacting (meth)acrylic acid on an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. The polyester (meth) acrylate can be obtained, for example, by esterifying hydroxyl groups of a polyester oligomer, which is obtained by condensation of a polyvalent carboxylic acid and a polyhydric alcohol and has a hydroxyl group at both ends, with (meth)acrylic acid, or by esterifying a hydroxyl group at the end of an oligomer, which is obtained by adding an alkylene oxide to a polyvalent carboxylic acid, with (meth) acrylic acid. The polyether (meth)acrylate can be obtained by esterifying a hydroxyl group of a polyether polyol with (meth)acrylic acid. The polybutadiene (meth)acrylate can be obtained by adding (meth)acrylate acid to the side chain of a polybutadiene oligomer. These oligomers may be used alone, or may be used in combination of two or more thereof.

These curable resins may be used alone, or may be used in combination of two or more thereof.

Among the curable resins described above, an ionizing radiation curable resin is preferably used from the viewpoint of providing excellent hard coat properties while imparting even better weather resistance to the resin molded article.

When an ionizing radiation curable resin is used for forming the hard coat layer 2, as a preferred aspect, a mixed resin of a combination of (i) a tri- or more functional ionizing radiation curable resin and (ii) a bifunctional (meth) acrylate monomer can be mentioned. Hereinafter, the tri- or more functional ionizing radiation curable resin (i) and the bifunctional (meth)acrylate monomer (ii) will be described.

«(i) Tri- or More Functional Ionizing Radiation Curable Resin»

The tri- or more functional ionizing radiation curable resin is not particularly limited as far as it is an ionizing radiation curable resin into which three or more functional groups are introduced. Preferably, a polyfunctional (meth) acrylate having three or more polymerizable unsaturated bonds in the molecule (tri- or more functional (meth) acrylate) can be mentioned. Examples of the polyfunctional (meth)acrylate include pentaerythritol-based (meth)acrylate, polycarbonate (meth)acrylate, urethane (meth)acrylate, epoxy (meth)acrylate, polyester (meth)acrylate, polyether (meth)acrylate, polybutadiene (meth)acrylate, silicone (meth)acrylate, and aminoplast resin (meth)acrylate. The pentaerythritol-based (meth)acrylate can be obtained, for example, by esterifying part or all of hydroxyl groups of pentaerythritol or a polymer thereof with (meth)acrylic acid. The polycarbonate (meth)acrylate can be obtained, for example, by esterifying part or all of hydroxyl groups of a polycarbonate polyol with (meth)acrylic acid. The urethane (meth)acrylate can be obtained, for example, by esterifying a polyurethane oligomer, which is obtained by reaction of a polyol such as a polyether polyol, a polyester polyol, or a polycarbonate polyol with a polyisocyanate, with (meth) acrylic acid. The epoxy (meth)acrylate can be obtained, for example, by reacting (meth)acrylic acid on an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. The polyester (meth) acrylate can be obtained, for example, by esterifying hydroxyl groups of a polyester oligomer, which is obtained by condensation of a polyvalent carboxylic acid and a polyhydric alcohol and has a hydroxyl group at both ends, with (meth)acrylic acid, or by esterifying a hydroxyl group at the end of an oligomer, which is obtained by adding an alkylene oxide to a polyvalent carboxylic acid, with (meth) acrylic acid. The polyether (meth)acrylate can be obtained by esterifying a hydroxyl group of a polyether polyol with (meth)acrylic acid. The polybutadiene (meth)acrylate can be obtained by adding (meth)acrylate acid to the side chain of a polybutadiene oligomer. The silicone (meth)acrylate can be obtained by modifying a silicone having a polysiloxane bond in the main chain with (meth)acrylic acid. The aminoplast resin (meth)acrylate can be obtained by modifying an aminoplast resin having many reactive groups in a small molecule with (meth)acrylic acid. These tri- or more functional ionizing radiation curable resins may be used alone, or may be used in combination of two or more thereof.

The number of functional groups of the tri- or more functional ionizing radiation curable resin is not particularly limited as far as it is 3 or more. However, from the viewpoint of providing more excellent weather resistance and hard coat properties to the resin molded article, it is, for example, 3 to 50, preferably 3 to 8, more preferably 4 to 6.

The average molecular weight of the tri- or more functional ionizing radiation curable resin vanes depending on its type and can not be uniformly defined. However, it is, for example, 200 to 100,000, preferably 500 to 50,000, more preferably 1,000 to 30,000. The average molecular weight of the tri- or more functional ionizing radiation curable resin means the mass average molecular weight measured by GPC analysis in terms of standard polystyrene.

Of these, urethane (meth)acrylate, more preferably urethane (meth)acrylate having a backbone such as polyether, polyester, or polycarbonate is preferred from the viewpoint of providing more excellent weather resistance and hard coat properties to the resin molded article.

These tri- or more functional ionizing radiation curable resins may be used alone, or may be used in combination of two or more thereof.

«(ii) Bifunctional (Meth)Acrylate Monomer»

The bifunctional (meth)acrylate monomer is required to have a structure in which two (meth)acryloyl groups are bonded via a cyclic or linear aliphatic linker region. The molecular weight of the bifunctional (meth)acrylate monomer is not particularly limited, and may be about 100 to 10,000, for example. From the viewpoint of providing more excellent weather resistance and hard coat properties to the resin molded article, the molecular weight of the bifunctional (meth)acrylate monomer is preferably 190 to 1,200, more preferably 190 to 600.

The ratio of the tri- or more functional ionizing radiation curable resin (i) to the bifunctional (meth)acrylate side monomer (ii) is not particularly limited, and it is desirable to use the tri- or more functional ionizing radiation curable resin (i) as a main agent. For example, the bifunctional (meth)acrylate monomer (ii) is used in an amount of 1 to 40 parts by mass, preferably 5 to 35 parts by mass, more preferably 10 to 30 parts by mass based on 100 parts by mass of the tri- or more functional ionizing radiation curable resin (i).

As for the type of the bifunctional (meth)acrylate monomer (ii), a bifunctional monomer may be appropriately selected from the above-mentioned (meth)acrylate monomers. From the viewpoint of providing even more excellent weather resistance and hard coat properties to the resin molded article, preferred examples of the bifunctional (meth)acrylate monomer (ii) include (ii-1) a (meth)acrylate monomer in which two (meth)acryloyl groups are bonded to one alicyclic or aliphatic heterocyclic ring either directly or via a linker region having a molecular weight of 200 or less and (ii-2) a bifunctional urethane (meth)acrylate monomer in which two (meth)acryloyl groups are bonded to an aliphatic chain via a urethane bond. Hereinafter, these bifunctional (meth)acrylate monomers will be described.

(Bifunctional (Meth)Acrylate Monomer (ii-1))

The bifunctional (meth)acrylate monomer (ii-1) is not particularly limited as far as it has a structure having one alicyclic or heterocyclic ring in one molecule and having two (meth)acryloyl groups (—C(=O)—CH (or CH$_3$)=CH$_2$) bonded to the alicyclic or heterocyclic ring either directly or via a linker region having a molecular weight of 200 or less.

The alicyclic or heterocyclic ring possessed by the bifunctional (meth)acrylate monomer (ii-1) may have either a monocyclic structure or a condensed ring structure. The number of rings of the alicyclic or heterocyclic ring (the number of rings in the case of a monocyclic structure) is not particularly limited, and is, for example, 5 to 10, preferably 5 to 8, more preferably 5 to 6. The alicyclic or heterocyclic ring may be a condensed ring in which, for example, 2 to 4, preferably 2 to 3 alicyclic or heterocyclic rings (monocyclic rings) having the above-mentioned number of rings are condensed with each other.

As the bifunctional (meth)acrylate monomer (ii-1), those having an alicyclic ring can be preferably mentioned.

Specific examples of the alicyclic or heterocyclic ring include dicyclopentane, tricyclodecane, cyclohexane, triazine, cyclopentane, and isocyanurate. Among them, dicyclopentane and tricyclodecane are preferred.

In addition, the alicyclic or heterocyclic ring may have a substituent, in addition to the (meth)acryloyl groups bonded directly or via a linker region having a molecular weight of 200 or less. The type of the substituent is not particularly limited, and examples thereof include an alkyl group having 1 to 5 carbon atoms, an alkoxyl group having 1 to 5 carbon atoms, a hydroxyalkyl group having 1 to 5 carbon atoms, a hydroxyl group, and a halogen atom. The number of such substituents varies depending on the structure of the alicyclic or heterocyclic ring and can not be uniformly defined, but it is, for example, 0 to 14, preferably 0 to 10, more preferably 0 to 6.

In the bifunctional (meth)acrylate monomer (ii-1), the (meth)acryloyl groups may be bonded to the alicyclic or heterocyclic ring either directly or via a linker. When the (meth)acryloyl groups are bonded to the alicyclic or heterocyclic ring via a linker, the molecular weight of the linker moiety is required to be 200 or less, and is preferably 14 to 200, more preferably 14 to 150, further preferably 14 to 120. The structure of the linker is not particularly limited as far as the molecular weight is within the above-mentioned range, and examples thereof include an alkylene group having 1 to 8 carbon atoms; bonds such as a urethane bond, an ester bond, an ether bond, a thioether bond, and an amide bond; and an alkylene group having 1 to 4 carbon atoms and including the above-mentioned bonds.

Specific examples of the linker include groups represented by the following general formulae (A) to (J).

[Chemical Formula 1]

$$—(CH_2)_{n1}—O— \qquad (A)$$

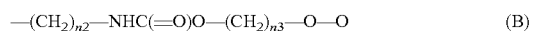

$$—(CH_2)_{n2}—NHC(=O)O—(CH_2)_{n3}—O—O \qquad (B)$$

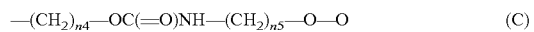

$$—(CH_2)_{n4}—OC(=O)NH—(CH_2)_{n5}—O—O \qquad (C)$$

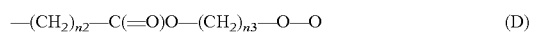

$$—(CH_2)_{n2}—C(=O)O—(CH_2)_{n3}—O—O \qquad (D)$$

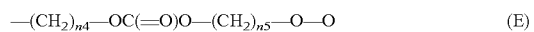

$$—(CH_2)_{n4}—OC(=O)O—(CH_2)_{n5}—O—O \qquad (E)$$

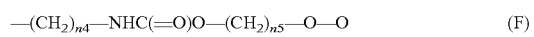

$$—(CH_2)_{n4}—NHC(=O)O—(CH_2)_{n5}—O—O \qquad (F)$$

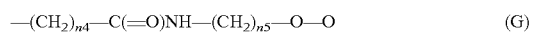

$$—(CH_2)_{n4}—C(=O)NH—(CH_2)_{n5}—O—O \qquad (G)$$

—(CH$_2$)$_{n6}$—O—(CH$_2$)$_{n7}$—O—O        (H)

—(CH$_2$)$_{n6}$—S—(CH$_2$)$_{n7}$—O—O        (I)

—O—        (J)

As for the groups represented by the general formulae (A) to (J), the left end is bonded to the alicyclic or heterocyclic ring, and the right end is bonded to the (meth)acryloyl groups.

In the general formula (A), n1 represents an integer of 1 to 8, preferably 1 to 6, more preferably 1 to 4.

In the general formulae (B) and (D), n2 represents an integer of 0 to 6, preferably 0 to 4, more preferably 0 to 2. In the general formulae (B) and (D), n3 represents an integer of 1 to 6, preferably 1 to 4, more preferably 1 to 2. The total number of n2 and n3 is 12 or less, preferably 6 or less, more preferably 4 or less.

In the general formulae (C), (E), (F) and (G), n4 represents an integer of 0 to 6, preferably 0 to 4, more preferably 0 to 2. In the general formulae (C), (E), (F) and (G), n5 represents an integer of 0 to 6, preferably 0 to 4, more preferably 0 to 2. The total number of n4 and n5 is 12 or less, preferably 6 or less, more preferably 4 or less.

In the general formulae (H) and (I), n6 represents an integer of 0 to 6, preferably 0 to 4, more preferably 0 to 2. In the general formulae (H) and (I), n7 represents an integer of 1 to 6, preferably 1 to 4, more preferably 1 to 2. The total number of n6 and n7 is 12 or less, preferably 6 or less, more preferably 4 or less.

Specific examples of the bifunctional (meth)acrylate monomer (ii-1) include a compound represented by the following general formula (1).

[Chemical Formula 2]

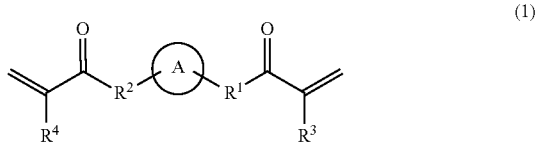
(1)

In the general formula (1), ring A represents a compound having 1 to 3 substituted or unsubstituted alicyclic groups or heterocyclic groups. Specific examples of the alicyclic group or the heterocyclic group are as described above. In the general formula (1), R$^1$ and R$^2$ are the same or different and each represent a single bond or a linker having a molecular weight of 200 or less. Specific examples of the linker are as described above. In the general formula (1), R$^3$ and R$^4$ are the same or different and each represent a hydrogen atom or a methyl group.

The molecular weight of the bifunctional (meth)acrylate monomer (ii-1) is not particularly limited as far as the monomer satisfies the above-mentioned structure, and it is, for example, 200 to 1,200, preferably 200 to 800, more preferably 300 to 500.

Specific examples of the bifunctional (meth)acrylate monomer (ii-1) include a (meth)acrylate monomer in which two molecules of hydroxyalkyl (meth)acrylate (the hydroxyalkyl group has 1 to 4 carbon atoms, preferably 1 to 2 carbon atoms) are urethane bonded to one molecule of isophorone diisocyanate, tricyclodecane dimethanol diacrylate, dicyclopentanyl di(meth)acrylate, caprolactone-modified dicyclopentenyl di(meth)acrylate, allylated cyclohexyl di(meth) acrylate, and isocyanurate di(meth)acrylate. Among them, a (meth)acrylate monomer in which two molecules of hydroxyalkyl (meth)acrylate are urethane bonded to one molecule of isophorone diisocyanate, and tricyclodecane dimethanol diacrylate are preferably used.

The bifunctional (meth)acrylate monomers (ii-1) may be used alone, or may be used in combination of two or more thereof.

The ratio of the tri- or more functional ionizing radiation curable resin (i) to the bifunctional (meth)acrylate monomer (ii-1) is not particularly limited, and it is desirable to use the tri- or more functional ionizing radiation curable resin (i) as a main agent. For example, the bifunctional (meth)acrylate monomer (ii-1) is used in an amount of 1 to 40 parts by mass, preferably 5 to 35 parts by mass, more preferably 10 to 30 parts by mass based on 100 parts by mass of the tri- or more functional ionizing radiation curable resin (i).

(Bifunctional Urethane (Meth)Acrylate Monomer (ii-2))

The bifunctional urethane (meth)acrylate monomer (ii-2) is not particularly limited as far as it has a structure having two (meth)acryloyl groups (—C(=O)—CH (or CH$_3$)=CH$_2$) bonded via an aliphatic chain including a urethane bond.

In the bifunctional urethane (meth)acrylate monomer (ii-2), it is preferred that the urethane bond be present not at the end of the aliphatic chain but in the form of being incorporated in the aliphatic chain.

The total number of carbon atoms constituting the aliphatic chain (the number of carbon atoms in the aliphatic chain excluding the urethane bond moiety) is not particularly limited, and is, for example, 2 to 90, preferably 2 to 70, more preferably 2 to 50.

In the bifunctional urethane (meth)acrylate monomer (ii-2), the aliphatic chain may include a bond other than a urethane bond. Examples of the bond other than the urethane bond include an ester bond, an amide bond, an ether bond, a carbonate bond, and a thioether bond.

Specific examples of the aliphatic chain including a urethane bond in the bifunctional urethane (meth)acrylate monomer (ii-2) include a group represented by the following general formula (K).

[Chemical Formula 3]

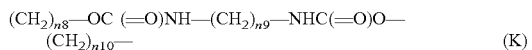

In the general formula (K), n8 and n10 are the same or different and each represent an integer of 1 to 35, preferably 2 to 25, more preferably 2 to 8, particularly preferably 2 to 6. In the general formula (K), n9 represents an integer of 1 to 35, preferably 2 to 25, more preferably 2 to 20, particularly preferably 2 to 8. The total number of n8, n9 and n10 is 90 or less, preferably 3 to 70, more preferably 6 to 50, particularly preferably 6 to 24, most preferably 6 to 20.

Specific examples of the bifunctional urethane (meth) acrylate monomer (ii-2) include a compound represented by the following general formula (2).

[Chemical Formula 4]

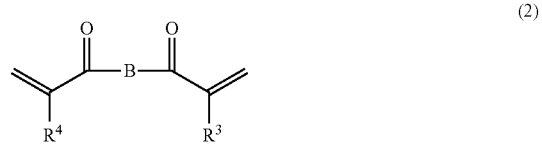
(2)

In the general formula (2), group B represents an aliphatic chain including a urethane bond. Specific examples of the aliphatic chain are as described above. In the general formula (2), $R^3$ and $R^4$ are the same or different and each represent a hydrogen atom or a methyl group.

The bifunctional urethane (meth)acrylate monomer (ii-2) is not particularly limited as to its molecular weight as far as the monomer satisfies the above-mentioned structure. The molecular weight is, for example, 190 to 5,000. In particular, from the viewpoint of densifying the molecular crosslinked structure of the hard coat layer 3 to make it difficult for components such as an ultraviolet absorber to be eliminated from the hard coat layer 3, the molecular weight of the bifunctional urethane (meth)acrylate monomer (ii-2) is preferably 190 to 1,200, more preferably 190 to 600.

The bifunctional urethane (meth)acrylate monomers (ii-2) may be used alone, or may be used in combination of two or more thereof.

The ratio of the tri- or more functional ionizing radiation curable resin (i) to the bifunctional urethane (meth)acrylate monomer (ii-2) is not particularly limited, and it is desirable to use the tri- or more functional ionizing radiation curable resin (i) as a main agent. For example, the bifunctional urethane (meth)acrylate monomer (ii-2) is used in an amount of 1 to 40 parts by mass, preferably 5 to 35 parts by mass, more preferably 10 to 30 parts by mass based on 100 parts by mass of the tri- or more functional ionizing radiation curable resin (i).

«Other Ionizing Radiation Curable Resins»

When the tri- or more functional ionizing radiation curable resin (i) is used in combination with the bifunctional (meth)acrylate monomer (ii) as the ionizing radiation curable resin, the resin composition may contain, as necessary, a monofunctional (meth)acrylate monomer, a tri- or more functional (meth)acrylate monomer, a bifunctional ionizing radiation curable resin and the like in addition to these ionizing radiation curable resins as far as the effect of the present invention is not impaired. The total amount of the tri- or more functional ionizing radiation curable resin (i) and the bifunctional (meth)acrylate monomer (ii) based on 100 parts by mass in total of the ionizing radiation curable resins contained in the hard coat layer 3 is, for example, 50 to 100 parts by mass, preferably 70 to 100 parts by mass, more preferably 80 to 100 parts by mass.

More specifically, when the tri- or more functional ionizing radiation curable resin (i) is used in combination with the bifunctional (meth)acrylate monomer (ii-1), the total amount of the tri- or more functional ionizing radiation curable resin (i) and the bifunctional (meth)acrylate monomer (ii-1) based on 100 parts by mass in total of the ionizing radiation curable resins contained in the hard coat layer 3 is, for example, 50 to 100 parts by mass, preferably 60 to 100 parts by mass, more preferably 60 to 80 parts by mass. When the tri- or more functional ionizing radiation curable resin (i) is used in combination with the bifunctional urethane (meth) acrylate monomer (ii-2), the total amount of the tri- or more functional ionizing radiation curable resin (i) and the bifunctional urethane (meth)acrylate monomer (ii-2) based on 100 parts by mass in total of the ionizing radiation curable resins contained in the hard coat layer 3 is, for example, 60 to 100 parts by mass, preferably 80 to 100.

<Other Additives>

The hard coat layer 2 may contain an ultraviolet absorber as necessary in order to provide weather resistance to ultraviolet exposure to the resin molded article. The type of the ultraviolet absorber used in the hard coat layer 2 is not particularly limited, and examples thereof include a hydroxyphenyl triazine compound, a benzotriazole compound, a benzophenone compound, an oxalic acid anilide compound, a salicylic acid phenyl ester compound, and an acrylonitrile compound. Among them, a hydroxyphenyl triazine compound and a benzotriazole compound are preferred, and a hydroxyphenyl triazine compound is more preferred. These ultraviolet absorbers may be used alone, or may be used in combination of two or more thereof.

The content of the ultraviolet absorber in the hard coat layer 2 is not particularly limited, and is, for example, 0.1 to 10 parts by mass, preferably 0.2 to 10 parts by mass, more preferably 0.5 to 5 parts by mass, particularly preferably 0.7 to 2 parts by mass based on 100 parts by mass in total of the ionizing radiation curable resins.

In addition to the components described above, the hard coat layer 2 may contain a light stabilizer as necessary in order to further improve weather resistance. The light stabilizer is preferably a hindered amine light stabilizer (HALS). Preferred examples of the light stabilizer include a reactive hindered amine light stabilizer that is reactive with the curable resin, that is, a reactive hindered amine light stabilizer having a reactive group in the molecule. Use of such a reactive hindered amine light stabilizer enables improvement in the hard coat properties (such as scratch resistance) without causing crosslinking inhibition and reduction in bleed out, so that a reduction in performance due to bleed out can be effectively suppressed. Specific examples of the reactive group include a functional group having an ethylenic double bond, such as a (meth)acryloyl group, a vinyl group, and an allyl group. As such a light stabilizer, for example, 1,2,2,6,6-pentamethyl-4-piperidinyl methacrylate (trade name "Sanol LS-3410" manufactured by BASF) or (trade name "FA-711MM" manufactured by Hitachi Chemical Co., Ltd.), and 2,2,6,6-tetramethyl-4-piperidinyl methacrylate (trade name "FA-712HM" manufactured by Hitachi Chemical Co., Ltd.) can be preferably mentioned. These light stabilizers may be used alone, or may be used in combination of two or more thereof.

The content of the light stabilizer in the hard coat layer 2 is not particularly limited, and is, for example, 0.5 to 10 parts by mass, preferably 1 to 8 parts by mass, more preferably 2 to 6 parts by mass based on 100 parts by mass in total of the ionizing radiation curable resins.

Furthermore, various additives other than the above may be contained in the hard coat layer 2 as necessary, as far as the effect of the present invention is not impaired. Examples of the additives include abrasion resistance improvers, polymerization inhibitors, crosslinking agents, infrared absorbers, antistatic agents, adhesion improvers, leveling agents, thixotropy imparting agents, coupling agents, lubricants, antifouling agents, plasticizers, antifoaming agents, filling agents, colorants, and fillers.

<Thickness of Hard Coat Layer 2>

The thickness of the hard coat layer 2 is not particularly limited, and is, for example, 1 to 100 μm, preferably 1.5 to 50 μm, more preferably 2 to 20 μm.

<Method for Forming Hard Coat Layer 2>

For forming the hard coat layer 2, a method suitable for the type of the used curable resin may be adopted. For example, in the case of using a thermosetting resin, a room temperature curable resin, a one-liquid reaction curable resin, or a two-liquid reaction curable resin, a resin composition for the hard coat layer 2, namely a mixture of these resins and various additives added as necessary, may be applied to the base material film 1 for releasing by a method such as gravure coating, bar coating, roll coating, reverse roll coating, or comma coating, and then cured by heating as necessary.

The resin composition for the hard coat layer 2 may be one that is obtained by dissolving or dispersing, in a solvent, the curable resin and additives added as necessary. The solvent used in the resin composition for the hard coat layer 2 may be any solvent as far as it exhibits solubility or compatibility with the curable resin and additives added as necessary, and an appropriate solvent may be selected according to the coating method of the resin composition for the hard coat layer 2, the drying method at the time of forming the hard coat layer 2 and the like. From the viewpoint of solubility or compatibility with the curable resin, drying property and the like, an organic solvent is preferred. Examples of the organic solvent include, but are not particularly limited to, alcohols such as methanol, ethanol, and isopropanol; esters such as ethyl acetate, butyl acetate, and propylene glycol monomethyl ether acetate; and ketones such as acetone, methyl ethyl ketone, cyclopentanone, cyclohexanone, isobutyl ketone, and methyl isobutyl ketone. These organic solvents may be used alone, or may be used in combination of two or more thereof.

In the case of using an ionizing radiation curable resin, a resin composition, which is obtained by mixing an ionizing radiation curable resin with various additives as necessary, may be applied to the base material film 1 for releasing by gravure coating, bar coating, roll coating, reverse roll coating, comma coating or the like, and cured by irradiation with ionizing radiation such as an electron beam or an ultraviolet ray.

In the case of using an electron beam for curing the ionizing radiation curable resin, the accelerating voltage can be appropriately selected according to the type of the used ionizing radiation curable resin, the thickness of the hard coat layer 2 and the like. Generally, the accelerating voltage is about 70 to 300 kV. The irradiation dose is preferably a dose with which the crosslinking density of the resin layer is saturated, and is generally selected within a range of 5 to 300 kGy (0.5 to 30 Mrad), preferably 10 to 100 kGy (1 to 10 Mrad). Further, the electron beam source is not particularly limited, and various kinds of electron beam accelerators, such as those of Cockcroft-Walton type, van de graaff type, tuned transformer type, insulated core transformer type, linear type, dynamitron type, and high frequency type can be used.

The hard coat layer 2 thus formed may be treated by the addition of various additives so as to have functions such as a hard coat function, an anticlouding coat function, an antiglare coat function, an antireflection coat function, an ultraviolet shielding coat function, and an infrared shielding coat function.

[Primer Layer 3]

The primer layer 3 is disposed between the hard coat layer 2 and the adhesive layer 3, and functions as a stress relieving layer for the hard coat layer 2 and plays a role of improving the adhesion of the hard coat layer 2.

In the transfer sheet of the present invention, the primer layer 3 is formed of a binder resin containing polyurethane having a mass average molecular weight of 40,000 to 100,000 and containing 1 to 30% by mass of an acrylic component. Use of such a specific binder resin enables improvement in weather-resistant adhesion between the hard coat layer 2 and the primer layer 3 and provision of excellent weather resistance to the resin molded article.

In the transfer sheet of the present invention, as the polyurethane used in the primer layer 3, one having an acrylic backbone in the polymer chain is used. The polyurethane having an acrylic backbone in the polymer chain is not particularly limited as far as it has a mass average molecular weight of 40,000 to 100,000 and contains 1 to 30% by mass of an acrylic component. For example, either of a urethane acrylic copolymer which is a copolymer of a urethane component and an acrylic component, and an acrylic resin having a hydroxyl group or an isocyanate group as a polyol component or a polyisocyanate component constituting the polyurethane may be used, and a urethane acrylic copolymer is preferred. The urethane acrylic copolymer can be produced, for example, by a method of reacting an acrylic resin having at least two hydroxyl groups in one molecule with a polyol compound and a polyisocyanate compound (see, for example, Japanese Patent Laid-open Publication No. 6-100653) and a method of reacting a urethane prepolymer having an unsaturated double bond at both ends with an acrylic monomer (see, for example, Japanese Patent Laid-open Publication No. 10-1524).

As the polyurethane used as the binder resin of the primer layer 3, those having, in the polymer chain, a polycarbonate backbone or a polyester backbone in addition to the acrylic backbone are preferred. The polyurethane having a polycarbonate backbone or a polyester backbone in the polymer chain may be one formed of, as a polyol component or an isocyanate component constituting the urethane resin, an acrylic resin having a hydroxyl group or an isocyanate group, and a polycarbonate resin or a polyester resin having a hydroxyl group or an isocyanate group. A polycarbonate-based urethane acrylic copolymer which is a copolymer of a polycarbonate-based urethane component and an acrylic component, or a polyester-based urethane acrylic copolymer which is a copolymer of a polyester-based urethane component and an acrylic component is more preferred. These kinds of polyurethane may be used alone, or may be used in combination of two or more thereof.

The polycarbonate-based urethane acrylic copolymer can be obtained, for example, by copolymerizing a polycarbonate-based urethane, which is obtained by reacting a carbonate diol with a diisocyanate, with a diol having an acrylic backbone. The polycarbonate-based urethane acrylic copolymer can also be obtained by reacting a diol having an acrylic backbone with a carbonate diol and a diisocyanate. Specific examples of the diol having an acrylic backbone include (meth)acrylic acid, (meth)acrylic acid alkyl esters having an alkyl group having about 1 to 6 carbon atoms, and oligomers or prepolymers (degree of polymerization: about 2 to 10) obtained by radical polymerization of these, in which two hydroxyl groups are introduced. Specific examples of the diisocyanate include aliphatic isocyanates such as hexamethylene diisocyanate; and alicyclic isocyanates such as isophorone diisocyanate and hydroconversion xylylene diisocyanate. Specific examples of the carbonate diol include a compound represented by the following general formula (3) (wherein $R^5$ is an alkylene group having 1 to 12 carbon atoms optionally having a substituent, a divalent heterocyclic group having 1 to 12 carbon atoms optionally having a substituent, or a divalent alicyclic group having 1 to 12 carbon atoms optionally having a substituent, and m1 is an integer of 1 to 10).

[Chemical Formula 5]

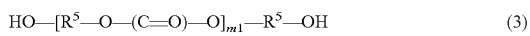

$$HO-[R^5-O-(C=O)-O]_{m1}-R^5-OH \qquad (3)$$

The polycarbonate-based urethane acrylic copolymer can also be obtained by radical polymerization of a polycarbonate-based polyurethane prepolymer, into which a radical-polymerizable group is introduced, with an acrylic monomer. Specific examples of the acrylic monomer include (meth)acrylic acid and (meth)acrylic acid alkyl esters having an alkyl group having about 1 to 6 carbon atoms.

The polyester-based urethane acrylic copolymer can be obtained, for example, by copolymerizing a polyester-based urethane, which is obtained by reacting an ester diol with a diisocyanate, with a diol having an acrylic backbone. Alternatively, the polyester-based urethane acrylic copolymer can also be obtained by reacting a diol having an acrylic backbone with an ester diol and a diisocyanate. Herein, the diol having an acrylic backbone and the diisocyanate are the same as those used for the production of the polycarbonate-based urethane acrylic copolymer. Specific examples of the ester diol include a compound represented by the following general formula (4) (wherein $R^6$ is an alkylene group having 1 to 12 carbon atoms optionally having a substituent, a divalent heterocyclic group having 1 to 12 carbon atoms optionally having a substituent, or a divalent alicyclic group having 1 to 12 carbon atoms optionally having a substituent, and m2 is an integer of 1 to 10).

[Chemical Formula 6]

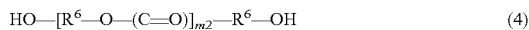

$$HO-[R^6-O-(C=O)]_{m2}-R^6-OH \qquad (4)$$

The polyester-based urethane acrylic copolymer can also be obtained by radical polymerization of a polyester-based polyurethane prepolymer, into which a radical-polymerizable group is introduced, with an acrylic monomer. The acrylic monomer is the same as that used for the production of the polycarbonate-based urethane acrylic copolymer.

As the polyurethane used in the primer layer 3, one having a mass average molecular weight of 40,000 to 100,000 is used. Use of such polyurethane satisfying the specific mass average molecular weight and the content of the acrylic component described later enables provision of excellent weather resistance to the resin molded article. From the viewpoint of providing more excellent weather resistance to the resin molded article, the mass average molecular weight of the polyurethane is preferably 50,000 to 80,000. Herein, the mass average molecular weight of the polyurethane is a value measured by GPC analysis in terms of standard polystyrene.

In order to provide excellent weather resistance to the resin molded article, the polyurethane used in the primer layer 3 is required to have a content of the acrylic component of 1 to 30% by mass. Herein, the content of the acrylic component in the polyurethane is the rate (% by mass) of the monomer constituting the acrylic backbone based on the total mass of the polyurethane. From the viewpoint of providing more excellent weather resistance to the resin molded article, the content of the acrylic component in the polyurethane is preferably 5 to 20% by mass, more preferably 10 to 20% by mass. The content of the acrylic component in the polyurethane can be calculated, for example, by measuring the NMR spectrum of the polyurethane and calculating the ratio of the peak area attributed to the acrylic component to the total peak area.

The primer layer 3 may contain a binder resin other than the polyurethane as far as the effect of the present invention is not impaired. Examples of the binder resin include a urethane resin, a (meth)acrylic resin, a vinyl chloride/vinyl acetate copolymer, a polyester resin, a butyral resin, chlorinated polypropylene, and chlorinated polyethylene. These binder resins may be used alone, or may be used in combination of two or more thereof. Among these binder resins, a urethane resin is preferably used.

In the case of using the polyurethane in combination with other binder resins in the primer layer 3, the mixing ratio between them is not particularly limited. For example, the content of the polyurethane may be 50 parts by mass or more, preferably 70 parts by mass or more, more preferably 85 parts by mass or more based on 100 parts by mass in total of the binder resins.

The primer layer 3 may contain an ultraviolet absorber as necessary in order to provide weather resistance to ultraviolet exposure to the resin molded article. The type of the ultraviolet absorber used in the primer layer 3 is the same as that of the ultraviolet absorber used in the hard coat layer 2.

The content of the ultraviolet absorber in the primer layer 3 is not particularly limited, and is, for example, 1 to 50 parts by mass, preferably 2 to 40 parts by mass, more preferably 3 to 35 parts by mass based on 100 parts by mass in total of the curable resins.

In addition to the above-mentioned components, the primer layer 3 may contain a light stabilizer as necessary in order to further improve weather resistance. Examples of the light stabilizer used in the primer layer 3 include a hindered amine light stabilizer (HALS), more specifically, a hindered amine light stabilizer having no reactive functional group, or a hindered amine light stabilizer having a reactive functional group which is preferably used for forming the hard coat layer 3. In particular, from the viewpoint of providing excellent stress relaxation performance to the primer layer 3, the light stabilizer used in the primer layer 3 is preferably a hindered amine light stabilizer having no reactive functional group. Specific examples of the hindered amine light stabilizer having no reactive functional group include 2-(3,5-di-tert-butyl-4-hydroxybenzyl)-2'-n-butyl malonic acid bis(1,2,2,6,6-pentamethyl-4-piperidyl), bis(1,2,2,6,6-pentamethyl-4-piperidyl) sebacate, bis(1-octyloxy-2,2,6,6-tetramethyl-4-piperidyl) sebacate, and tetrakis(2,2,6,6-tetramethyl-4-piperidyl)-1,2,3,4-butanetetracarboxylate. These light stabilizers may be used alone, or may be used in combination of two or more thereof.

The content of the light stabilizer in the primer layer 3 is not particularly limited, and is, for example, 0.5 to 20 parts by mass, preferably 1 to 15 parts by mass, more preferably 2 to 10 parts by mass based on 100 parts by mass in total of the curable resins.

In addition, the primer layer 3 may contain a curing agent as necessary in order to promote curing of the binder resin. Examples of the curing agent used in the primer layer 3 include isocyanate curing agents such as tolylene diisocyanate, diphenylmethane diisocyanate, hexamethylene diisocyanate, xylylene diisocyanate, cyclohexane phenylene diisocyanate, and naphthalene-1,5-diisocyanate. These curing agents may be used alone, or may be used in combination of two or more thereof.

The content of the curing agent in the primer layer 3 is not particularly limited, and is, for example, 5 to 40 parts by mass, preferably 8 to 35 parts by mass, more preferably 10 to 30 parts by mass based on 100 parts by mass in total of the curable resins.

Further, in order to suppress the blocking phenomenon, the primer layer 3 may contain an anti-blocking agent as necessary. Examples of the anti-blocking agent used in the primer layer 3 include inorganic particles such as silica, alumina, aluminum hydroxide, barium sulfate, talc, and calcium carbonate. These anti-blocking agents may be used alone, or may be used in combination of two or more thereof. The average particle size of the anti-blocking agent is not particularly limited, and is generally about 0.1 to 10 μm, preferably 0.5 to 8 μm, more preferably 0.5 to 5 μm from the viewpoint of transparency and suppression of the occurrence of the blocking phenomenon. The particle size of the anti-blocking agent is measured by a laser diffraction type particle size distribution measuring apparatus.

The content of the anti-blocking agent in the primer layer 3 is not particularly limited, and is, for example, 1 to 20 parts by mass, preferably (2 to 15 parts by mass, more preferably 3 to 10 parts by mass based on 100 parts by mass in total of the curable resins.

In addition, various additives other than the above may be contained in the primer layer 3 as necessary, as far as the effect of the present invention is not impaired. Examples of the additives include abrasion resistance improvers, infrared absorbers, antistatic agents, adhesion improvers, leveling agents, thixotropy imparting agents, coupling agents, plasticizers, antifoaming agents, filling agents, solvents, and colorants. The additives can be appropriately selected from those that are commonly used.

The thickness of the primer layer 3 is not particularly limited, and is, for example, 0.1 to 10 μm, preferably 0.1 to 5 μm, further preferably 1 to 4 μm.

The primer layer 3 is formed by applying a resin composition for forming the primer layer 3 that contains a binder resin to the hard coat layer 2 by a normal coating method such as gravure coating, gravure reverse coating, gravure offset coating, spinner coating, roll coating, reverse roll coating, kiss coating, wheeler coating, dip coating, solid coating by silk screen, wire bar coating, flow coating, comma coating, pour coating, brushing or spray coating, or a transfer coating method. Herein, the transfer coating method is a method of forming a coating film of the primer layer 3 on a thin sheet (film base material), and thereafter coating the intended surface of the hard coat layer 2 with the coating film.

The resin composition for forming the primer layer 3 may be one that is obtained by dissolving or dispersing, in a solvent, the binder resin and additives added as necessary. The solvent used in the resin composition for forming the primer layer 3 may be any solvent as far as it exhibits solubility or compatibility with the binder resin and additives added as necessary, and an appropriate solvent may be selected according to the coating method of the resin composition for forming the primer layer 3, the drying method at the time of forming the primer layer 3 and the like. From the viewpoint of solubility or compatibility with the binder resin, drying property and the like, an organic solvent is preferred. Examples of the organic solvent include, but are not particularly limited to, alcohols such as methanol, ethanol, and isopropanol; esters such as ethyl acetate, butyl acetate, and propylene glycol monomethyl ether acetate; and ketones such as acetone, methyl ethyl ketone, cyclopentanone, cyclohexanone, isobutyl ketone, and methyl isobutyl ketone. These organic solvents may be used alone, or may be used in combination of two or more thereof.

In order to improve the adhesion between the hard coat layer 2 and the primer layer 3 when forming the primer layer 3, it is possible to keep the hard coat layer 2 in a semi-cured state, and then apply the resin composition for forming the primer layer to the hard coat layer and completely cure the hard coat layer 2, whereby the adhesion between the hard coat layer 2 and the primer layer 3 is improved.

[Adhesive Layer 4]

The adhesive layer 4 is a layer disposed on a surface of the primer layer reverse to the base material film 1 for releasing, and plays a role of being adhered to a resin molded article as a transfer object.

The adhesive layer 4 is required to be an adhesive layer made of an adhesive resin such as a heat-sensitive adhesive resin or a pressure-sensitive adhesive resin, and is preferably a heat seal layer which develops a welding action by heating. Specific examples of the adhesive resin constituting the adhesive layer 4 include an acrylic resin, a vinyl chloride resin, a vinyl acetate resin, a vinyl chloride-vinyl acetate copolymer resin, a styrene-acrylic copolymer resin, a polyester resin, a polyamide resin, and a polyolefin resin. These adhesive resins may be used alone, or may be used in combination of two or more thereof.

In addition to the adhesive resin, the adhesive layer 4 may contain various additives as necessary. Examples of the additives include ultraviolet absorbers, light stabilizers, and colorants. The additives can be appropriately selected from those that are commonly used.

The thickness of the adhesive layer 4 is generally 0.1 to 10 μm, preferably 0.5 to 6 μm, more preferably 1 to 4 μm.

The adhesive layer 4 is formed by applying an adhesive resin to a predetermined layer by a method such as gravure coating, bar coating, roll coating, reverse roll coating, or comma coating.

In the transfer sheet of the present invention, a cover film (protective film) formed of a resin such as a polyethylene resin is desirably stuck to the surface of the adhesive layer 4 for protection of the layer until the transfer sheet is transferred to the transfer object. In the case of sticking a cover film to the surface of the adhesive layer 4, the cover film may be removed at the time of use of the transfer sheet to expose the adhesive layer.

[Release Layer]

The release layer is a layer which is provided as necessary between the base material film 1 for releasing and the hard coat layer 2 in order to facilitate peeling of the base material film 1 for releasing.

The release layer is formed of a thermoplastic resin capable of enhancing the separability of the base material film 1 for releasing from the hard coat layer 2. Specific examples of the thermoplastic resin forming the release layer include a silicone resin, a fluorine resin, an acrylic-melamine resin, a polyester resin, a polyolefin resin, a polystyrene resin, a polyurethane resin, and a vinyl chloride-vinyl acetate resin.

The thickness of the release layer is generally 0.2 to 20 μm, preferably 0.5 to 15 μm, more preferably 1 to 10 μm.

The release layer is formed by applying a thermoplastic resin to the base material film 1 for releasing by a method such as gravure coating, bar coating, roll coating, reverse roll coating, or comma coating.

[Colored Layer 5]

The colored layer 5 is a layer provided as necessary in at least one position of between the base material film 1 for releasing and the hard coat layer 2, between the hard coat layer 2 and the primer layer 3, between the primer layer 3 and the adhesive layer 4, and on a surface of the adhesive layer 4 reverse to the primer layer 3 for the purpose of concealing an adhesive-coated portion at the time of fixing the hard coated article produced by using the transfer sheet of the present invention, displaying information, imparting design property and the like.

For example, when the hard coated article produced by using the transfer sheet of the present invention is used as a window frame member of an automobile, the hard coated article may be fixed by a method such as fixation with an adhesive, fitting, or screwing, and fixation with an adhesive is preferred due to ease of work. In this case, if the entire surface of the hard coated article is transparent, the adhesive-coated portion is likely to be visible from the side reverse to the side having the adhesive-coated portion formed thereon, and the appearance may be impaired. By providing the colored layer 5 for concealment in a part that is a region where the adhesive-coated portion is desirably invisible, it is possible to conceal the region. In addition, when it is desired to display information such as the manufacturer and regulations or to give a design such as a pattern, information can be displayed and a design can be given by the colored layer 5.

The colored layer 5 is required to be provided in at least one position of between the base material film 1 for releasing and the hard coat layer 2, between the hard coat layer 2 and the primer layer 3, between the primer layer 3 and the adhesive layer 4, and on a surface of the adhesive layer 4 reverse to the primer layer 3. From the viewpoint of adhesion, weather resistance, and abrasion resistance, it is preferred that the colored layer 5 be provided between the primer layer 3 and the adhesive layer 4.

Further, in the transfer sheet of the present invention, two or more layers having different color tones may be provided as the colored layer 5 in the same or different arrangement positions. For example, from the side of the hard coat layer 2, a colored layer 5 exhibiting black color and a colored layer 5 exhibiting white color may be provided in this order, or from the side of the hard coat layer 2, a colored layer 5 exhibiting white color and a colored layer exhibiting black color may be provided in this order.

The shape of the colored layer 5 is not particularly limited as far as it is provided partially when viewed from a direction perpendicular to the plane direction of the transfer sheet of the present invention, and may be appropriately selected according to the purpose of the colored layer 5. For example, in the case where the colored layer 5 is provided for concealing an adhesive-coated portion when the hard coated article produced by using the transfer sheet of the present invention is fixed, it is preferred to use a colored layer having a frame shape for concealing the outer edge portion of the hard coated article. In the case where the colored layer has a frame shape concealing the outer edge portion of the hard coated article, the width of the colored layer 5 may be set to, for example, about 10 to 200 mm. Furthermore, in the case of providing the frame-shaped colored layer 5 for concealing the outer edge portion of the hard coated article, another colored layer 5 having a gradation pattern may be further provided in the vicinity of the boundary between the frame-shaped colored layer 5 and the region where the frame-shaped colored layer 5 is not provided. Such a gradation pattern may be a pattern in which pictures such as circles (dots), rectangles (lines), squares, and triangles as a pattern become smaller or come to have a lighter color as they are away from the frame-shaped colored layer 5.

Further, in the case where the colored layer 5 is provided for the purpose of displaying information or imparting a design, the shape of the colored layer 5 may be a letter, a symbol, a numeral, a pattern or the like including a corporate logo, a trademark, or indication of regulations.

The color tone exhibited by the colored layer 5 is not particularly limited, and any one of colored transparent, colored translucent, colored opaque and the like may be adopted according to the purpose. For example, when the colored layer 5 is used for partially concealing the lower part, it is preferably colored opaque.

More specifically, in the case where the colored layer 5 is provided for concealment, the OD (optical density) value of the colored layer 5 is preferably as high as possible from the viewpoint of imparting excellent concealing property. Specifically, it is 3 or more, preferably 4 or more, more preferably 5 or more. Herein, the OD value of the colored layer 5 is a value obtained by the following method.

(Method for Measuring OD Value of Colored Layer 5)

In the transfer sheet of the present invention after the peeling of the base material film 1 for releasing, or the hard coated article produced by using the transfer sheet of the present invention, the OD value of the part where the colored layer 5 is not provided ($OD_{low}$ value) and the OD value of the part where the colored layer 5 is provided ($OD_{high}$ value) are measured. A value obtained according to the calculation formula ($OD_{high}$ value–$OD_{low}$ value) is the OD value of the colored layer 5. Herein, the $OD_{low}$ value and the $OD_{high}$ value are values measured with a transmission densitometer at a central wavelength of 555 nm.

The above-mentioned OD value of the colored layer 5 can be attained by appropriately setting the kind and content of the pigment or dye used for forming the colored layer 5.

The colored layer 5 is formed of a colorant and a binder resin.

As the colorant, either one of a pigment and a dye may be used, or both of them may be used. From the viewpoint of durability and weather resistance, a pigment is preferably used. The color exhibited by the colorant may be appropriately selected according to the purpose of the colored layer 5. In the case of providing the colored layer 5 for concealment, a black pigment is suitable. The type of the black pigment is not particularly limited, and examples thereof include carbon black, titanium black, perylene black, and azomethine azo black.

The binder resin is not particularly limited, and examples thereof include an acrylic resin, a vinyl chloride resin, a vinyl acetate resin, a polyester resin, a polyamide resin, a polyolefin resin, a urethane resin, and a copolymer resin of these resins (for example, a urethane acrylic copolymer resin). These binder resins may be either of one-liquid curable type or two-liquid curable type. These binder resins may be used alone, or may be used in combination of two or more thereof.

In addition, the colored layer 5 may contain, as necessary, additives such as a polymerization inhibitor, a crosslinking agent, an infrared absorber, an antistatic agent, an adhesion improver, a leveling agent, a thixotropy imparting agent, a coupling agent, a plasticizer, an antifoaming agent, a filling agent, a colorant, and a filler.

The thickness of the colored layer 5 may be appropriately selected according to its purpose, the OD value to be set, the kind and content of the used colorant and the like, and is generally 0.1 to 20 μm, preferably 1 to 15 μm, more preferably 3 to 10 μm.

The colored layer 5 can be formed by applying an ink composition for the colored layer 5, which contains a colorant, a binder resin, and additives added as necessary, to a predetermined layer by a method such as gravure coating, screen printing, offset printing, flexographic printing, comma coating, inkjet, or a dispenser.

The ink composition for forming the colored layer 5 may be one that is obtained by dissolving or dispersing, in a solvent, a colorant, a binder resin, and additives added as necessary. The solvent used in the ink composition for the colored layer 5 may be any solvent as far as it exhibits solubility or compatibility with the colorant, the binder resin, and additives added as necessary, and an appropriate solvent may be selected according to the coating method of the ink composition for the colored layer 5, the drying method at the time of forming the colored layer 5 and the like. From the viewpoint of solubility or compatibility with the colorant and the binder resin, drying property and the like, an organic solvent is preferred. Examples of the organic solvent include, but are not particularly limited to, alcohols such as methanol, ethanol, and isopropanol; esters such as ethyl acetate, butyl acetate, and propylene glycol monomethyl ether acetate; and ketones such as acetone, methyl ethyl ketone, cyclopentanone, cyclohexanone, isobutyl ketone, and methyl isobutyl ketone. These organic solvents may be used alone, or may be used in combination of two or more thereof.

Production of Transfer Sheet

The transfer sheet of the present invention is produced by forming and laminating a hard coat layer 2, a primer layer 3, and an adhesive layer 4 in this order on a base material film 1 for releasing. In the case where a release layer is provided between the base material film 1 for releasing and the hard coat layer 2, after a release layer is formed on the base material film 1 for releasing, the hard coat layer 2, the primer layer 3, and the adhesive layer 4 may be formed and laminated in this order on the release layer.

The methods of forming the hard coat layer 2, the primer layer 3, the adhesive layer 4, and the release layer are as described above.

Application of Transfer Sheet

The transfer sheet of the present invention is used to impart weather resistance as well as hard coat properties (such as scratch resistance) to a resin molded article as a transfer object by transferring the adhesive layer 4, the primer layer 3, and the hard coat layer 2 to the resin molded article. The base material film 1 for releasing in the transfer sheet of the present invention is peeled off after the above-mentioned layers are transferred to a resin molded article.

In the transfer sheet of the present invention, the resin molded article as a transfer object is not particularly limited, and examples thereof include exterior and interior materials of building structures of general housing and public facilities, interior and exterior parts of automobiles, solar cell covers, solar cell substrates, members of household electric appliances, illumination covers, front panels or covers of various display devices, and lenses used for traffic signals and optical devices. Considering that the transfer sheet of the present invention can impart excellent weather resistance to a resin molded article, as a resin molded article as a transfer object of the transfer sheet of the present invention, it is preferred to use an exterior member or semi-exterior member used in an environment exposed to direct sunlight and weather. Specific examples of the exterior or semi-exterior members include exterior members for vehicles such as automobiles and railroad vehicles (various windows, sunroofs, roof panels, window reflectors, indicator lamp lenses, side mirrors, headlamp covers, etc.); building materials such as balcony partitions, roof members for terraces and carports, entrance doors, and windows of buildings; wall materials such as soundproof walls and windshield walls; and lenses used for traffic signals.

In the transfer sheet of the present invention, the transfer object is required to be a resin molded article to which hard coat properties (scratch resistance or the like) are desired to be imparted. The transfer object is preferably organic glass that is transparent and strong, and can be used as a substitute for the current glass. Specific examples of the organic glass include polycarbonate, polymethyl methacrylate, polyacrylate, polyethylene terephthalate, polyethylene naphthalate, polyolefin, and ABS. Among these examples of organic glass, polycarbonate is excellent in impact resistance and transparency, and is preferably used.

When polycarbonate is used as the organic glass, its melt volume rate (MVR) is not particularly limited, and is about 6 to 25 $cm^3/10$ minutes, preferably about 6 to 12 $cm^3/10$ minutes. The lower the melt volume rate is, the more excellent impact resistance is exhibited. Thus, a polycarbonate resin having an appropriate melt volume rate should be selected according to the application of the organic glass. The melt volume rate is a value measured in accordance with JIS K 7210-1999 at a temperature of 300° C. under a load of 1.2 kgf.

In addition, in a resin molded article as a transfer object, a plurality of same or different kinds of resins may be laminated on each other. A resin molded article in which a plurality of same or different kinds of resins are laminated on each other can be prepared, for example, by coextrusion.

The thickness of the resin molded article as a transfer object is not particularly limited, and may be appropriately set according to the application of the organic glass. It is generally 0.5 to 50 mm, preferably 1 to 20 mm, more preferably 1.5 to 5 mm.

2. Hard Coated Article Including Transfer Sheet and Production Method Thereof

Figure 3:
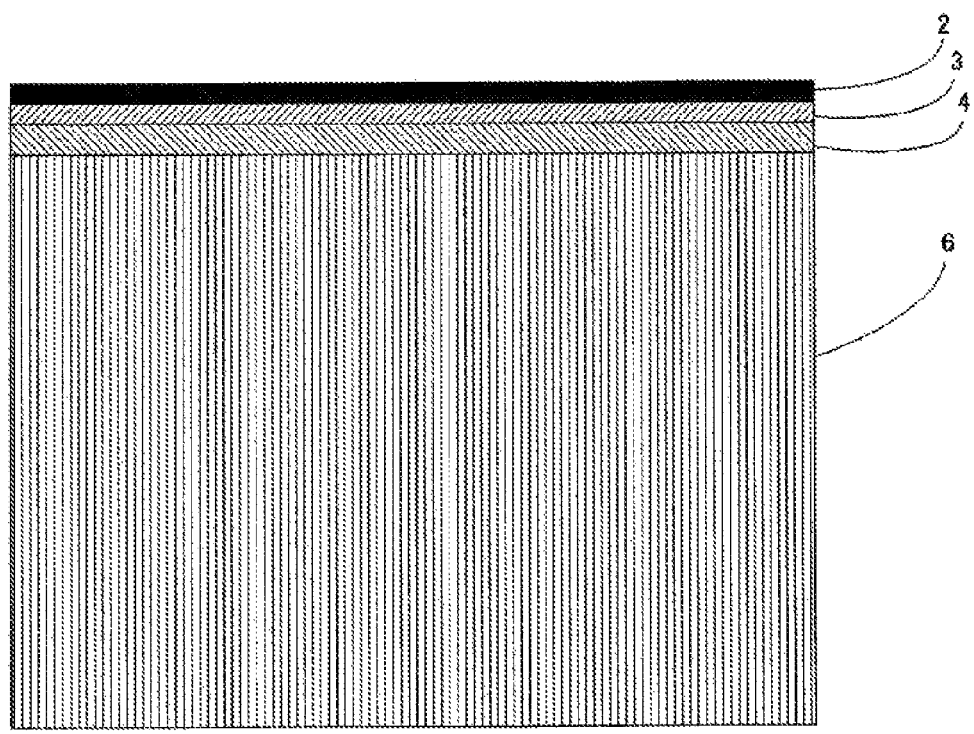
FIG. 3 is a schematic view showing a cross section of a hard coated article according to one aspect of the present invention.

A hard coated article can be obtained by sticking the transfer sheet of the present invention to a resin molded article 6 as a transfer object so that the adhesive layer 4 comes into contact with the resin molded article 6, and then peeling off the base material film 1 for releasing. That is, as shown in FIG. 3, the hard coated article produced by using the transfer sheet of the present invention has a laminated structure including at least the resin molded article 6, the adhesive layer 4, the primer layer 3, and the hard coat layer 2 laminated in this order. Further, in the case where the colored layer 5 is provided in the transfer sheet of the present invention, the hard coated article obtained using the transfer sheet of the present invention includes the colored layer 5 in at least one position of on a surface of the hard coat layer 2, between the hard coat layer 2 and the primer layer 3, between the primer layer 3 and the adhesive layer 4, and between the adhesive layer 4 and the resin molded article 4. The hard coated article produced using the transfer sheet of the present invention can have hard coat properties (scratch resistance) and excellent weather resistance due to the adhesive layer 4, the primer layer 3, and the hard coat layer 2 laminated on the resin molded article 6.

The type and the like of the resin molded article 6 used in the hard coated article are as described above.

More specifically, as a method for producing a hard coated article using the transfer sheet of the present invention, there are the following methods, for example: a method of sticking the transfer sheet of the present invention to a pre-molded resin molded article, and then peeling off the base material film 1 for releasing (hereinafter referred to as "first method"); and a method of integrating a resin to serve as a transfer object with the transfer sheet of the present invention in injection-molding the resin, and then peeling off the base material film 1 for releasing (hereinafter referred to as "second method").

As a method for producing the hard coated article by the first method, there is a method of molding a resin molded article by extrusion molding or the like, and immediately after the molding or after cooling, pressure-bonding the surface of the adhesive layer 4 of the transfer sheet of the present invention onto the resin molded article using a roll or the like to laminate them on each other. When pressure-bonding the surface of the adhesive layer 4 of the transfer sheet of the present invention onto the resin molded article, the adhesive layer 4 may be heated as necessary to such an extent that at least part thereof is melted. The transfer sheet can be heated, for example, by preheating of the transfer sheet before pressure bonding, or heating of the transfer sheet simultaneous with pressure bonding using a hot pressure roll. Further, the resin molded article may be preheated before transfer. After sticking the transfer sheet of the present invention to the resin molded article, the base material film 1 for releasing may be peeled off and removed. Further, after the transfer sheet of the present invention is stuck to the resin molded article, the laminate may be further subjected to molding processing such as bending. Such molding processing may be carried out either before or after peeling of the base material film 1 for releasing.

In addition, production of the hard coated article according to the second method can be carried out by a known injection molding method using a transfer sheet.

Specifically, as one aspect of the method for producing a hard coated article according to the second method, a method of carrying out the following steps I and II can be mentioned.

Step I: The transfer sheet of the present invention is inserted into an injection molding die (the adhesive layer 4 is disposed on the side of the resin to be injected), the injection molding die is closed, and the flowable resin is injected into the die to integrate the resin with the transfer sheet of the present invention.

Step II: The base material film 1 for releasing is peeled off the transfer sheet of the present invention integrated with the resin molded article.

In the step I, in order to facilitate integration of the transfer sheet of the present invention with the injected resin, the transfer sheet of the present invention may be preheated as necessary before being inserted into the injection molding die. Even without preheating of the transfer sheet of the present invention, it is possible to integrate the injected resin with the transfer sheet of the present invention by the residual heat of the injected resin. Further, in the step I, the transfer sheet of the present invention inserted into the injection molding die may be made to follow the shape of the injection molding die by vacuum suction or the like before the resin is injected.

Further, in the step II, the base material film 1 for peeling may be peeled off simultaneously with the separation of the injection molding die or after the separation of the injection molding die. Further, after the base material film 1 for peeling is peeled off in the step II, a protective film may be provided on the surface of the hard coat layer 2. Further, the base material film 1 for releasing may be left to maintain the state where the base material film 1 for releasing is attached to the transfer sheet until the use of the hard coated article.

As another aspect of the method for producing a hard coated article according to the second method, there can be mentioned a method including the following steps 1 to 3.

Step 1: The transfer sheet of the present invention is supplied and fixed between a pair of male and female dies in an open state so that the adhesive layer 4 surface faces the cavity side. Then, the adhesive layer 4 of the transfer sheet of the present invention is heated to soften, and the transfer sheet of the present invention is vacuum-sucked from the side of the die facing the base material film 1 for releasing to adhere the transfer sheet to the movable die so that the sheet follows the shape of the die, whereby the transfer sheet of the present invention is preformed.

Step 2: After both the dies are clamped, the flowable resin is injected and filled in the cavity formed by both the dies and then solidified to laminate and integrate the resin molded article and the transfer sheet of the present invention.

Step 3: The movable die is separated from the fixed die, the resin molded article integrated with the transfer sheet of the present invention is taken out, and the base material film 1 for releasing is peeled off the transfer sheet.

In addition, in the step 3, the base material film 1 for peeling may be peeled off simultaneously with the separation of the dies or after the separation of the dies. Further, after the base material film 1 for peeling is peeled off in the step 3, a protective film may be provided on the surface of the hard coat layer 2. Further, the base material film 1 for releasing may be left to maintain the state where the base material film 1 for releasing is attached to the transfer sheet until the use of the hard coated article.

EXAMPLES

Hereinafter, the present invention will be described in detail by way of examples and comparative examples. However, the present invention is not limited to examples.

Test Example 1

Performance Evaluation of Transfer Sheet and Hard Coated Article Including the Transfer Sheet 1. Production of Transfer Sheets (Examples 1 to 16 and Comparative Examples 1 to 8)

Any one of the following resin compositions A to D for forming a hard coat layer was applied to a base material film for releasing (thickness: 75 μm) made of biaxially stretched polyethylene terephthalate and cured by electron beam irradiation at 10 Mrad to laminate a hard coat layer (3 μm) on the support film layer. Subsequently, the surface of the hard coat layer was subjected to corona discharge treatment, and one of the following primer layer forming resin compositions 1 to 6 was applied by a gravure reverse method to form a primer layer having a thickness of 3 μm. Further, a heat sealing resin (acrylic resin) was applied to the primer layer by a gravure reverse method to form an adhesive layer having a thickness of 4 μm. Thus, a transfer sheet including a hard coat layer, a primer layer, and an adhesive layer laminated in this order on a base material film for releasing was obtained. The types of the resin composition for forming the hard coat layer and the resin composition for forming the primer layer used for producing the transfer sheets of examples and comparative examples are as shown in Table 1.

<Resin Composition A for Forming Hard Coat Layer (Used in Examples 1 to 3 and 6 to 9, and Comparative Examples 1 to 8)>

Hexafunctional ionizing radiation curable resin (a mixture of 60 parts by mass of hexafunctional urethane acrylate (molecular weight: about 1,000) and 40 parts by mass of bifunctional caprolactone-modified urethane acrylate (molecular weight: about several thousands)): 100 parts by mass Hydroxyphenyl triazine ultraviolet absorber ("Tinuvin 479" manufactured by BASF Japan Ltd.): 0.7 parts by mass Light stabilizer having a reactive functional group (1,2,2,6,6-pentamethyl-4-piperidinyl methacrylate, "Sanol LS-3410" manufactured by Nippon Nyukazai Co., Ltd.): 4.2 parts by mass Nonreactive silicone compound (polyether-modified silicone oil): 0.3 parts by mass Scratch-resistant filler (silica particles, average particle size: 2 µm): 2 parts by weight <Resin Composition B for Forming Hard Coat Layer (Used in Examples 4, 5, 11, and 14 to 16)>

Polyfunctional acrylate having an isocyanurate ring (mass average molecular weight: about 27,000: mainly formed of a tetra- to octafunctional acrylate polymer): 80 parts by mass Bifunctional urethane acrylate monomer$^{\#1}$ (molecular weight: about 400) in which two (meth)acryloyl groups are bonded via an aliphatic chain including a urethane bond: 20 parts by mass

1 The bifunctional urethane acrylate monomer is a monomer in which one molecule of a compound represented by the following formula (X) is bonded to two molecules of a compound represented by the following formula (Y), and an isocyanate group of the compound represented by the formula (X) is reacted with a hydroxyl group of the compound represented by the formula (Y) to form a urethane bond.

Hydroxyphenyl triazine ultraviolet absorber ("Tinuvin 479" manufactured by BASF Japan Ltd.): 0.7 parts by mass Light stabilizer having a reactive functional group (1,2,2,6,6-pentamethyl-4-piperidinyl methacrylate, "Sanol LS-3410" manufactured by Nippon Nyukazai Co., Ltd.): 4.2 parts by mass Nonreactive silicone compound (polyether-modified silicone oil): 0.3 parts by mass Scratch-resistant filler (silica particles, average particle size: 2 µm): 2 parts by weight

[Chemical Formula 7]

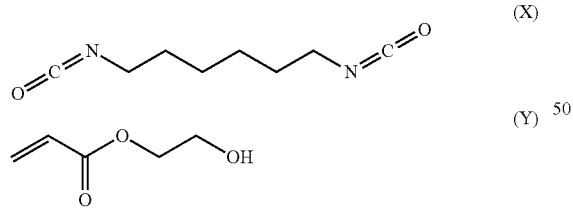

<Resin Composition C for Forming Hard Coat Layer (Used in Example 10)>

Hexafunctional ionizing radiation curable resin (a mixture of 60 parts by mass of hexafunctional urethane acrylate (molecular weight: about 1,000) and 40 parts by mass of bifunctional caprolactone-modified urethane acrylate (molecular weight: about several thousands)): 100 parts by mass Alicyclic urethane diacrylate in which two molecules of hydroxyethyl acrylate are urethane bonded to isophorone diisocyanate: 16 parts by mass Hydroxyphenyl triazine ultraviolet absorber ("Tinuvin 479" manufactured by BASF Japan Ltd.): 2.3 parts by mass Light stabilizer having a reactive functional group (1,2,2,6,6-pentamethyl-4-piperidinyl methacrylate, "Sanol LS-3410" manufactured by Nippon Nyukazai Co., Ltd.): 4.2 parts by mass Nonreactive silicone compound (polyether-modified silicone oil): 0.3 parts by mass Scratch-resistant filler (silica particles, average particle size: 2 µm): 2 parts by weight <Resin Composition D for Forming Hard Coat Layer (Used in Examples 12 and 13)>

Polyfunctional acrylate having an isocyanurate ring (mass average molecular weight: about 27,000: mainly formed of a tetra- to octafunctional acrylate polymer): 80 parts by mass Bifunctional urethane acrylate monomer$^{\#2}$ (molecular weight: about 400) in which two (meth)acryloyl groups are bonded via an aliphatic chain including a urethane bond: 20 parts by mass

2 The bifunctional urethane acrylate monomer is the same as that used in the resin composition B for forming a hard coat layer.

Hydroxyphenyl triazine ultraviolet absorber ("Tinuvin 479" manufactured by BASF Japan Ltd.): 2 parts by mass Light stabilizer having a reactive functional group (1,2,2,6,6-pentamethyl-4-piperidinyl methacrylate, "Sanol LS-3410" manufactured by Nippon Nyukazai Co., Ltd.): 4.2 parts by mass Nonreactive silicone compound (polyether-modified silicone oil): 0.3 parts by mass Scratch-resistant filler (silica particles, average particle size: 2 µm): 2 parts by weight <Resin Composition 1 for Forming Primer Layer (Used in Examples 1 to 7, 10 to 13, and 14, and Comparative Examples 1 to 4)>

Polycarbonate-based urethane acrylic copolymer (mass average molecular weight and content of acrylic component are as shown in Table 1): 100 parts by mass Hydroxyphenyl triazine ultraviolet absorber*$^{1}$: 17 parts by mass
*1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*$^{2}$: 13 parts by mass
*2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*$^{3}$: 8 parts by mass
*3 Tinuvin 123 (trade name), bis(1-octyloxy-2,2,6,6-tetramethyl-4-piperidyl) sebacate), manufactured by BASF Japan Ltd.

Anti-blocking agent*$^{4}$: 9 parts by mass
*4 Silica particles, average particle size: 3 µm Curing agent (hexamethylene diisocyanate): 25 parts by mass <Resin Composition 2 for Forming Primer Layer (Used in Examples 8 and 9)>

Polycarbonate-based urethane acrylic copolymer (mass average molecular weight and content of acrylic component are as shown in Table 1): 100 parts by mass Hydroxyphenyl triazine ultraviolet absorber*[1]: 17 parts by mass
  *1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*[2]: 13 parts by mass
  *2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*[3]: 8 parts by mass
  *3 Tinuvin 123 (trade name), bis(1-octyloxy-2,2,6,6-tetramethyl-4-piperidyl) sebacate), manufactured by BASF Japan Ltd.

Curing agent (hexamethylene diisocyanate): 25 parts by mass

<Resin Composition 3 for Forming Primer Layer (Used in Comparative Example 5)>

Polycarbonate-based urethane resin (mass average molecular weight: 10,000 to 20,000): 100 parts by mass Hydroxyphenyl triazine ultraviolet absorber*[1]: 17 parts by mass
  *1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*[2]: 13 parts by mass
  *2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*[3]: 8 parts by mass
  *3 Tinuvin 123 (trade name), bis(1-octyloxy-2,2,6,6-tetramethyl-4-piperidyl) sebacate), manufactured by BASF Japan Ltd.

Anti-blocking agent*[4]: 9 parts by mass
  *4 Silica particles, average particle size: 3 μm Curing agent (hexamethylene diisocyanate): 25 parts by mass <Resin Composition 4 for Forming Primer Layer (Used in Comparative Example 6)>

Polycarbonate-based urethane resin (mass average molecular weight: 10,000 to 20,000): 20 parts by mass Acrylic polyol (mass average molecular weight: 30,000 to 40,000): 80 parts by mass Hydroxyphenyl triazine ultraviolet absorber*[1]: 17 parts by mass
  *1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*[2]: 13 parts by mass
  *2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*[3]: 8 parts by mass
  *3 Tinuvin 123 (trade name), bis(1-octyloxy-2,2,6,6-tetramethyl-4-piperidyl) sebacate), manufactured by BASF Japan Ltd.

Anti-blocking agent*[4]: 9 parts by mass
  *4 Silica particles, average particle size: 3 μm Curing agent (hexamethylene diisocyanate): 25 parts by mass <Resin Composition 5 for Forming Primer Layer (Used in Comparative Example 7)>

Acrylic polyol (mass average molecular weight: 30,000 to 40,000): 100 parts by mass Hydroxyphenyl triazine ultraviolet absorber*[1]: 17 parts by mass
  *1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*[2]: 13 parts by mass
  *2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*[3]: 8 parts by mass
  *3 Tinuvin 123 (trade name), bis(1-octyloxy-2,2,6,6-tetramethyl-4-piperidyl) sebacate), manufactured by BASF Japan Ltd.

Anti-blocking agent*[4]: 9 parts by mass
  *4 Silica particles, average particle size: 3 μm Curing agent (hexamethylene diisocyanate): 25 parts by mass <Resin Composition 6 for Forming Primer Layer (Used in Comparative Example 8)>

Polycarbonate-based urethane resin (mass average molecular weight: 10,000 to 20,000): 70 parts by mass Acrylic polyol (mass average molecular weight: 30,000 to 40,000): 30 parts by mass Hydroxyphenyl triazine ultraviolet absorber*[1]: 17 parts by mass
  *1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*[2]: 13 parts by mass
  *2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*[3]: 8 parts by mass
  *3 Tinuvin 123 (trade name), bis(1-octyloxy-2,2,6,6-tetramethyl-4-piperidyl) sebacate), manufactured by BASF Japan Ltd.

Anti-blocking agent*[4]: 9 parts by mass
  *4 Silica particles, average particle size: 3 μm Curing agent (hexamethylene diisocyanate): 25 parts by mass <Resin Composition 7 for Forming Primer Layer (Used in Examples 15 and 16)>

Polyester-based urethane acrylic copolymer (mass average molecular weight and content of acrylic component are as shown in Table 1): 100 parts by mass Hydroxyphenyl triazine ultraviolet absorber*[1]: 17 parts by mass
  *1 Tinuvin 400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Ltd.

Hydroxyphenyl triazine ultraviolet absorber*[2]: 13 parts by mass
  *2 Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.

Hindered amine light stabilizer*[3]: 8 parts by mass
  *3 Tinuvin 123 (trade name), bis(1-octyloxy-2,2,6,6-tetramethyl-4-piperidyl) sebacate), manufactured by BASF Japan Ltd.

Anti-blocking agent*[4]: 9 parts by mass
  *4 Silica particles, average particle size: 3 μm Curing agent (hexamethylene diisocyanate): 25 parts by mass In each of examples and comparative examples, the mass average molecular weight of the binder resin used in the primer layer was calculated by GPC under the following conditions in terms of polystyrene (a calibration curve was produced by measurement at nine levels between molecular weights of 1,110,000 and 1,050).

Equipment name: Waters 2695 (manufactured by Waters Corporation)
Column: Three GPC LF-804 (Shodex) columns connected in series
Solvent: tetrahydrofuran 2. Production of Hard Coated Article Using each of the transfer sheets obtained above, the hard coat layer, the primer layer, and the adhesive layer were transferred to a polycarbonate plate to obtain a hard coated article including a polycarbonate plate, an adhesive layer, a primer layer, and a hard coat layer laminated in this order. The transfer sheets of Examples 1 to 9 and 11, and Comparative Examples 1 to 8 were transferred by the following first method, and the transfer sheets of Examples 10 and 12 to 16 were transferred by the following second method.

(First Method)

A 2 mm thick polycarbonate plate was heated using a hot plate at 150° C. The transfer sheet was placed on one surface of the heated polycarbonate plate so that the adhesive layer was on the side of the polycarbonate plate, and then the laminate was subjected to heat lamination three times with a heat lamination roll at 190° C. Thereafter, the base material film for releasing was peeled off, whereby a hard coated article including a polycarbonate plate, an adhesive layer, a primer layer, and a hard coat layer laminated in this order was produced.

(Second Method)

A transfer sheet was supplied and fixed between a pair of male and female dies (movable die and fixed die) in an open state so that the adhesive layer surface faced the cavity side. Then, the adhesive layer of the transfer sheet was heated to 100° C. to soften, and the transfer sheet was vacuum-sucked from the side of the die facing the base material film for releasing to adhere the softened transfer sheet to the movable die so that the sheet followed the shape of the die, whereby the transfer sheet was preformed. Next, after both the dies were clamped, the flowable polycarbonate resin (PANLITE L-1250Z manufactured by Teijin Ltd., MVR 8 cm$^3$/10 min) was injected and filled in the cavity formed by both the dies at a molding temperature of 315° C. and a pressure of 170 MPa and then solidified to laminate and integrate the polycarbonate molded article with the transfer sheet. Thereafter, the movable die was separated from the fixed die, and the base material film for releasing was peeled off to produce the hard coated article including the polycarbonate, adhesive layer, primer layer, and hard coat layer laminated in this order.

3. Evaluation of Weather Resistance of Hard Coated Article

On each of the hard coated articles immediately after production, 5 to 15 cycles of the following weather resistance test was conducted using an accelerated weathering tester (SUV-W23, manufactured by (IWASAKI ELECTRIC CO., LTD.)): one cycle being (1) ultraviolet rays at 60 mW/cm$^2$, 63° C., 50 RH % for 20 hours, (2) ultraviolet rays in the dark at 30° C., 98 RH % for 4 hours, and (3) water jetting for 30 seconds before and after the above condition (2).

In a rectangular area of 1.25 cm×2.5 cm on the surface of the hard coat layer of each hard coated article after the weather resistance test, an X-shaped slit was diagonally made with a cutter knife. Next, a peel test was carried out five times on the surface of the hard coat layer with the slit using cellophane tape (CT405AP-24) manufactured by NICHIBAN Co., Ltd. After five times of the peel test, the residual rate of the hard coat layer (rate of hard coat layer that did not peel off) was determined.

The obtained results are shown in Table 1. From these results, it was found that when the hard coat layer was formed of a cured product of a resin composition containing an ionizing radiation curable resin, and the primer layer was formed using a urethane acrylic copolymer having a mass average molecular weight of 40,000 to 100,000 and containing 1 to 30% by mass of an acrylic component (Examples 1 to 16), the residual rate of the hard coat layer after the weather resistance test was high, the primer layer and the hard coat layer were firmly adhered to each other, and the hard coated article had excellent weather resistance. In particular, in the case where a primer layer was formed using a urethane acrylic copolymer having a mass average molecular weight of 50,000 to 80,000 and containing 5 to 20% by mass of an acrylic component (Examples 4 to 16), the hard coated article was observed to have markedly excellent weather resistance.

On the other hand, in the case where the primer layer was formed using a urethane acrylic copolymer having a mass average molecular weight of less than 40,000 even though containing 1 to 30 mass % of an acrylic component (Comparative Example 1), the hard coated article was poor in weather resistance. Even when the content of the acrylic component in the urethane acrylic copolymer was 1 to 30% by mass, when the primer layer was formed using a urethane acrylic copolymer having a mass average molecular weight exceeding 100,000 (Comparative Example 2), whitening of the hard coated article was observed by the weather resistance test, and the hard coated article did not have weather resistance. Furthermore, even when the mass average molecular weight was in the range of 40,000 to 100,000, when the primer layer was formed using a urethane acrylic copolymer having a content of the acrylic component out of the range of 1 to 30% by mass (Comparative Examples 3 and 4), the hard coated article was poor in weather resistance. Furthermore, the hard coated article did not exhibit excellent weather resistance also when the primer layer was formed using an acrylic polyol alone, urethane acrylate alone, or a mixture of an acrylic polyol and urethane acrylate as a binder resin (Comparative Examples 5 to 8).

TABLE 1

| | Hard coat layer Resin composition used | Primer layer Resin composition used | Polyurethane Mass average molecular weight | Content (% by mass) of acrylic component | Production method of hard coated article | Residual rate (%) of hard coat layer after weather resistance test | | | |
|---|---|---|---|---|---|---|---|---|---|
| | | | | | | After 5 cycles | After 7.5 cycles | After 10 cycles | After 15 cycles |
| Comparative Example 1 | A | 1 | 25,000 | 30 | First method | 30 | 10 | — | — |
| Example 1 | A | 1 | 50,000 | 30 | First method | 80 | 60 | — | — |
| Example 2 | A | 1 | 65,000 | 30 | First method | 90 | 60 | — | — |
| Example 3 | A | 1 | 80,000 | 30 | First method | 90 | 70 | — | — |

TABLE 1-continued

| | Hard coat layer Resin composition used | Primer layer Resin composition used | Polyurethane Mass average molecular weight | Content (% by mass) of acrylic component | Production method of hard coated article | Residual rate (%) of hard coat layer after weather resistance test | | | |
|---|---|---|---|---|---|---|---|---|---|
| | | | | | | After 5 cycles | After 7.5 cycles | After 10 cycles | After 15 cycles |
| Comparative Example 2 | A | 1 | 120,000 | 30 | First method | Whitening #1 | Whitening #1 | — | — |
| Example 4 | B | 1 | 50,000 | 5 | First method | 95 | 90 | 85 | |
| Example 5 | B | 1 | 80,000 | 5 | First method | 100 | 95 | 100 | — |
| Comparative Example 3 | A | 1 | 50,000 | 70 | First method | 0 | 0 | — | — |
| Comparative Example 4 | A | 1 | 50,000 | 50 | First method | 0 | 0 | — | — |
| Example 6 | A | 1 | 50,000 | 20 | First method | 100 | 100 | 70 | 80 |
| Example 7 | A | 1 | 50,000 | 10 | First method | 100 | 100 | 100 | 100 |
| Example 8 | A | 2 | 50,000 | 20 | First method | 100 | 80 | 50 | — |
| Example 9 | A | 2 | 50,000 | 10 | First method | 100 | 100 | 90 | — |
| Example 10 | C | 1 | 50,000 | 10 | Second method | 100 | 100 | 100 | 95 |
| Example 11 | B | 1 | 50,000 | 10 | First method | 100 | 80 | 70 | — |
| Example 12 | D | 1 | 50,000 | 10 | Second method | 100 | 100 | 95 | — |
| Example 13 | D | 1 | 50,000 | 10 | Second method | 100 | 90 | 70 | — |
| Example 14 | B | 1 | 50,000 | 15 | Second method | 100 | 100 | 85 | 80 |
| Example 15 | B | 7 | 50,000 | 20 | Second method | 100 | 100 | 85 | 80 |
| Example 16 | B | 7 | 50,000 | 10 | Second method | 100 | 100 | 100 | 100 |
| Comparative Example 5 | A | 3 | — | — | First method | Initial adhesion NG#2 | | | |
| Comparative Example 6 | A | 4 | — | — | First method | 0 | 0 | — | — |
| Comparative Example 7 | A | 5 | — | — | First method | 0 | 0 | — | — |
| Comparative Example 8 | A | 6 | — | — | — | Application impossible#3 | | | |

1 Since the hard coated article whitened in the weather resistance test, no peel test was carried out.
2 Since the hard coat layer was not sufficiently adhered to the primer layer before the hard coated article was subjected to the weather resistance test, the weather resistance test was not carried out.
3 Since it was impossible to apply the resin composition for forming the primer layer, the transfer sheet could not be produced.

Test Example 2

Performance Evaluation of Transfer Sheet with Colored Layer Having Concealing Function and Hard Coated Article Including the Transfer Sheet 1. Production of Transfer Sheet (Example 17)

The resin composition A for forming a hard coat layer used in Test Example 1 was applied to a base material film for releasing (thickness: 75 μm) made of biaxially stretched polyethylene terephthalate and cured by electron beam irradiation at 10 Mrad to laminate a hard coat layer (thickness: 3 μm) on the support film layer. Subsequently, the surface of the hard coat layer was subjected to corona discharge treatment, and the primer layer forming resin composition 1 used in Test Example 1 was applied by a gravure reverse method to form a primer layer having a thickness of 3 μm. Further, to the primer layer, an ink composition for forming a colored layer (containing a mixture of 210 parts by weight of a black pigment: carbon black (average particle size: 24 nm), 100 parts by weight of a binder resin: a vinyl chloride resin, and 100 parts by weight of an acrylic resin) was applied three times by a gravure direct method to form a colored layer (thickness: 3 μm) having a frame shape (shape having an opening) having a length of 170 mm, a width of 100 mm, and a width of 20 mm. Further, a heat sealing resin (acrylic resin) was applied to the colored layer by a gravure reverse method to form an adhesive layer having a thickness of 4 μm. Thus, a transfer sheet including a hard coat layer, a primer layer, a colored layer provided in part, and an adhesive layer laminated in this order on a base material film for releasing was obtained. The OD value of the colored layer in the obtained transfer sheet was measured by the above method using a transmission densitometer (D200-II, manufactured by GretagMacbeth), and it was 5.8.

2. Production of Hard Coated Article and Evaluation of Weather Resistance

Using the transfer sheet obtained above, a hard coated article was produced in the same manner as in Test Example 1, and weather resistance was evaluated. The obtained results are shown in Table 2. From these results, it was found that even when a colored layer was provided, when the hard coat layer was formed of a cured product of a resin composition containing an ionizing radiation curable resin, and the primer layer was formed using a urethane acrylic copolymer having a mass average molecular weight of 40,000 to 100,000 and containing 1 to 30% by mass of an acrylic component (Example 17), the residual rate of the hard coat layer after the weather resistance test was high, the primer layer and the hard coat layer were firmly adhered to each other, and the hard coated article had excellent weather resistance.

TABLE 2

| | Hard coat layer Resin composition used | Primer layer | | | | Residual rate (%) of hard coat layer after weather resistance test | | | |
|---|---|---|---|---|---|---|---|---|---|
| | | Polyurethane | | | | | | | |
| | | Resin composition used | Mass average molecular weight | Content (% by mass) of acrylic component | Production method of hard coated article | After 5 cycles | After 7.5 cycles | After 10 cycles | After 15 cycles |
| Example 17 | A | 1 | 50,000 | 30 | Second method | 80 | 60 | — | — |

DESCRIPTION OF REFERENCE SIGNS

1: Base material film for releasing
2: Hard coat layer
3: Primer layer
4: Adhesive layer
5: Colored layer
6: Resin molded article

The invention claimed is:

1. A hard coated article comprising: at least a hard coat layer, a primer layer, an adhesive layer, and a resin molded article in this order,
wherein the hard coat layer is formed of a cured product of a resin composition containing a curable resin, and
the primer layer is formed of a binder resin containing polyurethane having a mass average molecular weight of 50,000 to 80,000; wherein the polyurethane is a copolymer consisting of an acrylic component and a urethane component with 5 to 20% by mass of the acrylic component, and
wherein the urethane component is a polycarbonate-based urethane.

2. The hard coated article according to claim 1, wherein the curable resin is an ionizing radiation curable resin.

3. The hard coated article according to claim 1, wherein the curable resin is a combination of (i) a tri- or more functional ionizing radiation curable resin and (ii) a bifunctional (meth)acrylate monomer.

4. The hard coated article according to claim 1, wherein the adhesive layer contains a heat-sensitive adhesive resin or a pressure-sensitive adhesive resin.

5. The hard coated article according to claim 1, further comprising a colored layer provided in part of at least one position of on a surface of the hard coat layer, between the layer and the adhesive layer, or between the adhesive layer and the resin molded article.

* * * * *